(12) United States Patent
Bordes et al.

(10) Patent No.: US 12,143,578 B2
(45) Date of Patent: Nov. 12, 2024

(54) NEURAL NETWORK BASED FILTER IN VIDEO CODING

(71) Applicant: InterDigital CE Patent Holdings, SAS, Paris (FR)

(72) Inventors: Philippe Bordes, Cesson-Sevigne (FR); Franck Galpin, Cesson-Sevigne (FR); Thierry Dumas, Cesson-Sevigne (FR); Pavel Nikitin, Rennes (FR); Fabrice Urban, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 51 days.

(21) Appl. No.: 17/925,479

(22) PCT Filed: May 24, 2021

(86) PCT No.: PCT/EP2021/063771
§ 371 (c)(1),
(2) Date: Nov. 15, 2022

(87) PCT Pub. No.: WO2021/244884
PCT Pub. Date: Dec. 9, 2021

(65) Prior Publication Data
US 2023/0188713 A1    Jun. 15, 2023

(30) Foreign Application Priority Data

Jun. 4, 2020 (EP) .................................. 20305591
Nov. 20, 2020 (EP) .................................. 20306417
(Continued)

(51) Int. Cl.
*H04N 7/12* (2006.01)
*H04N 19/117* (2014.01)
(Continued)

(52) U.S. Cl.
CPC ......... *H04N 19/117* (2014.11); *H04N 19/132* (2014.11); *H04N 19/172* (2014.11); *H04N 19/42* (2014.11)

(58) Field of Classification Search
CPC .. H04N 19/117; H04N 19/132; H04N 19/172; H04N 19/42; H04N 19/147;
(Continued)

(56) References Cited

U.S. PATENT DOCUMENTS 10,311,334 B1 *   6/2019   Florez Choque .. G06V 10/7747
11,485,576 B2 *  11/2022   Lert, Jr. ............... B65G 1/1378
(Continued)

FOREIGN PATENT DOCUMENTS

EP         3451293 A1     3/2019
WO    WO2017036370 A1     3/2017
(Continued)

OTHER PUBLICATIONS

Yao et al., "CE13-2.1: Convolutional Neural Network Filter (CNNF) for Intra Frame", Document: JVET-N0169, Joint Video Experts Team (JVET), of ITU-T SG 16 WP 3 and ISO/IEC JTC 1/SC 29/WG 11, 14th Meeting: Geneva, CH, 19-27, pp. 1-8, Mar. 2019.
(Continued)

*Primary Examiner* — Gims S Philippe
(74) *Attorney, Agent, or Firm* — Xiaoan Lu

(57) ABSTRACT

In one implementation, to perform in-loop filtering of a version of reconstructed samples of a block, only a single offset parameter is signaled in the bitstream. Based on the version of reconstructed samples, a pixel-wise weight mask is generated using a neural network. Because the neural network parameters are known at both the encoder and decoder, these parameters need not to be signaled in the bitstream. The single offset parameter scaled by the weighted mask is used to adjust the samples in the block.
(Continued)

Thus, even though only a single offset parameter is used, the samples are adjusted by pixel-wise offsets. The neural network may also take other parameters, such as quantization parameters and picture types as input. Further, there can be multiple neural networks that generate different weight masks, where different offsets are signaled and one or more of the neural networks are to be selected for filtering.

16 Claims, 21 Drawing Sheets

(30) Foreign Application Priority Data

Dec. 21, 2020 (EP) .................................... 20306628
Apr. 7, 2021 (EP) .................................... 21305444

(51) Int. Cl.
*H04N 19/132* (2014.01)
*H04N 19/172* (2014.01)
*H04N 19/42* (2014.01)

(58) Field of Classification Search
CPC ...... H04N 19/154; H04N 19/61; H04N 19/82; H04N 19/85; H04N 19/86; G06N 3/045; G06N 3/048; G06N 3/08
See application file for complete search history.

(56) References Cited

U.S. PATENT DOCUMENTS

| | | | |
|---|---|---|---|
| 2009/0034622 A1 | 2/2009 | Huchet et al. | |
| 2016/0360210 A1* | 12/2016 | Xiu .................. | H04N 19/593 |
| 2019/0230054 A1 | 7/2019 | Kassemi et al. | |
| 2019/0230354 A1 | 7/2019 | Kim | |
| 2021/0099710 A1 | 4/2021 | Salehifar et al. | |
| 2021/0243447 A1* | 8/2021 | Li ..................... | H04N 19/593 |
| 2021/0243455 A1* | 8/2021 | Rapaka ............. | H04N 19/176 |
| 2022/0116655 A1* | 4/2022 | Xiu .................. | H04N 19/159 |
| 2022/0217332 A1* | 7/2022 | Filippov ............ | H04N 19/159 |

FOREIGN PATENT DOCUMENTS

| | | |
|---|---|---|
| WO | WO2019072097 A1 | 4/2019 |
| WO | WO2019115865 A1 | 6/2019 |
| WO | WO2019194460 A1 | 10/2019 |
| WO | WO2019205871 A1 | 10/2019 |

OTHER PUBLICATIONS

Wang et al., "CE13: Dense Residual Convolutional Neural Network based In-Loop Filter (Test 2.2 and 2.3)" Document: JVET-N0254-v2, Joint Video Experts Team (JVET), of ITU-T SG 16 WP 3 and ISO/IEC JTC 1/SC 29/WG 11, 14th Meeting: Geneva, CH, 19-27, pp. 1-6, Mar. 2019.

Dai et al., "CE13: Experimental results of CNN-based In-Loop Filter (USTC)", Document: JVET-N0513, Joint Video Experts Team (JVET), of ITU-T SG 16 WP 3 and ISO/IEC JTC 1/SC 29/WG 11, pp. 1-5, 2019

Huchet et al., "Decision trees for denoising in H.264/AVC video sequences", Visual Communications and Image Processing; XP030081214, Jan. 29, 2008-Jan. 31, 2008,*abstract* paragraph [01.2]*.

Yin et al., CE13-1.2: Adaptive convolutional neural network loop filter, Document: JVET-N0480-V2, Joint Video Experts Team (JVET), of ITU-T SG 16 WP 3 and ISO/IEC JTC 1/SC 29/WG 1114th Meeting: Geneva, pp. 1-5, Mar. 2019.

Xu et al., "Non-CE10: A CNN based in-loop filter for intra frame", Document: JVET-O0157, Joint Video Experts Team (JVET) of ITU-T SG 16 WP 3 and ISO/IEC JTC 1/SC 29/WG 11, 15th Meeting: Gothenburg, SE, pp. 1-5, Jul. 3-12, 2019.

Guo et al., "One-to-Many Network for Visually Pleasing Compression Artifacts Reductions", pp. 3038-3047, Jul. 21, 2017.

Kawamura et al., "CE13-2.6/CE13-2.7: Evaluation results of CNN based in-loop filtering", Document: JVET-N0710, Joint Video Experts Team (JVET), of ITU-T SG 16 WP 3 and ISO/IEC JTC 1/SC 29/WG 11, 14th Meeting: Geneva, CH, 19-27, pp. 1-4, Mar. 2019.

Isiao et al., "CE13-1.1: Convolutional neural network loop filter", Document: JVET-N010-v1, 14th Meeting: Geneva, CH, 19-27, pp. 1-5, Mar. 2019.

Park et al., "CNN-Based In-Loop Filtering for Coding Efficiency Improvement", pp. 1-5, IEEE, Jul. 11, 2016.

* cited by examiner

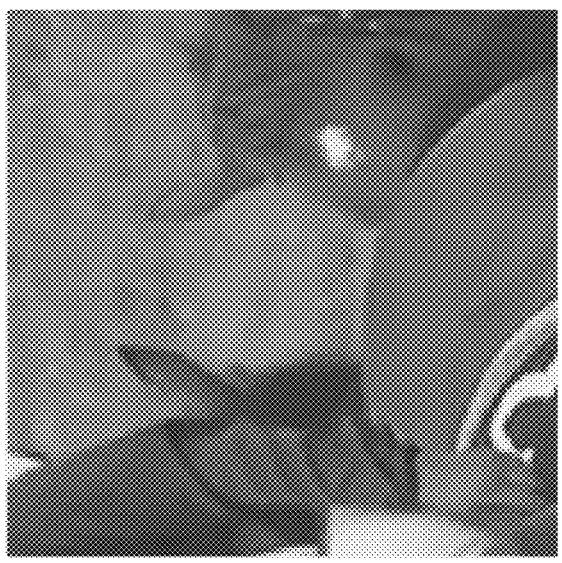
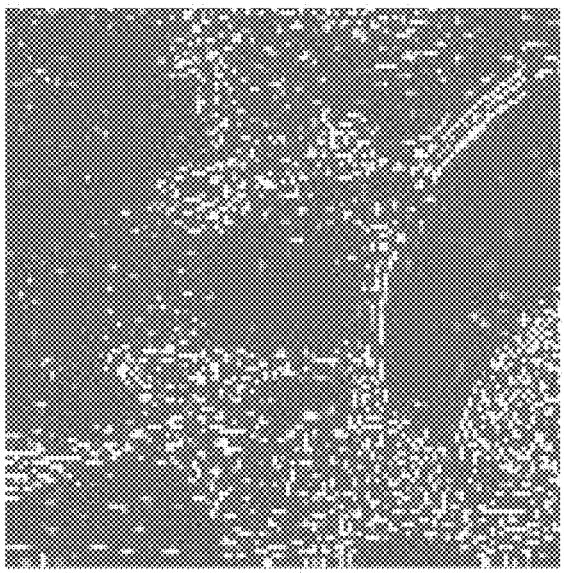
FIG. 11

Mutual Combination of NN filters $offset_0 \times$ ▨ $+ offset_1 \times$ ▨ $=$ ▨ Corr (a)

Spatial Combination of NN filters $offset_0 \times$ ▨ $=$ ▨ Corr (b)

$offset_0 \times$ ▨ $+ offset_1 \times$ ▨ $=$ ▨ Corr (c)

$offset_0 \times$ ▨ $+ offset_1 \times$ ▨ $=$ ▨ Corr (d)

$offset_0 \times$ ▨ $+ offset_1 \times$ ▨ $+ offset_2 \times$ ▨ $+ offset_3 \times$ ▨ $=$ ▨ Corr (e)

$offset_0 \times$ ▨ $+ offset_1 \times$ ▨ $=$ ▨ Corr (f)

FIG. 24

NEURAL NETWORK BASED FILTER IN VIDEO CODING

CROSS REFERENCE TO RELATED APPLICATIONS

This application is a U.S. National Stage Application under 35 U.S.C. 371 of International Patent Application No. PCT/EP2021/063771, filed May 24, 2021, which is incorporated herein by reference in its entirety.

This application claims the benefit of European Patent Application Nos. EP20306417.5 filed Nov. 20, 2020 and EP20305591.8 filed Jun. 4, 2020, each of which is incorporated herein by reference in its entirety.

TECHNICAL FIELD

The present embodiments generally relate to a method and an apparatus for filtering in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the to differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: accessing a version of reconstructed samples of a region of a picture; generating a weight for a respective sample of a plurality of samples in said region based on said version of reconstructed samples of said region, using a neural network; encoding or decoding a single offset parameter for said region; and filtering said region by adjusting said plurality of samples in said region, wherein a sample in said region is adjusted responsive to a weight for said sample and said offset for said region.

According to another embodiment, an apparatus for video encoding or decoding is provided, comprising one or more processors, wherein said one or more processors are configured to: access a version of reconstructed samples of a region of a picture; generate a weight for a respective sample of a plurality of samples in said region based on said version of reconstructed samples of said region, using a neural network; encode or decode a single offset parameter for said region; and filter said region by adjusting said plurality of samples in said region, wherein a sample in said region is adjusted responsive to a weight for said sample and said offset for said region.

According to another embodiment, an apparatus of video encoding or decoding is provided, comprising: means for accessing a version of reconstructed samples of a region of a picture; means for generating a weight for a respective sample of a plurality of samples in said region based on said version of reconstructed samples of said region, using a neural network; means for encoding or decoding a single offset parameter for said region; and means for filtering said region by adjusting said plurality of samples in said region, wherein a sample in said region is adjusted responsive to a weight for said sample and said offset for said region.

According to another embodiment, an apparatus of video encoding or decoding is provided, comprising: means for accessing a version of reconstructed samples of a region of a picture; means for generating a plurality of weights for a sample of a plurality of samples in said region based on said version of reconstructed samples of said region, using a plurality of neural networks; means for encoding or decoding a plurality of offset parameters for said region; and means for filtering said region by adjusting said plurality of samples in said region, wherein a sample in said region is adjusted responsive to said plurality of weights for said sample and said plurality of offsets for said region.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

FIG. 11 illustrates a portion of a picture to be filtered, the weight mask from the NN, and the filter result.

FIG. 24 shows examples of spatial partitioning with K=2 and K=4, where different patterns are associated to different NN filters.

DETAILED DESCRIPTION

Figure 1:
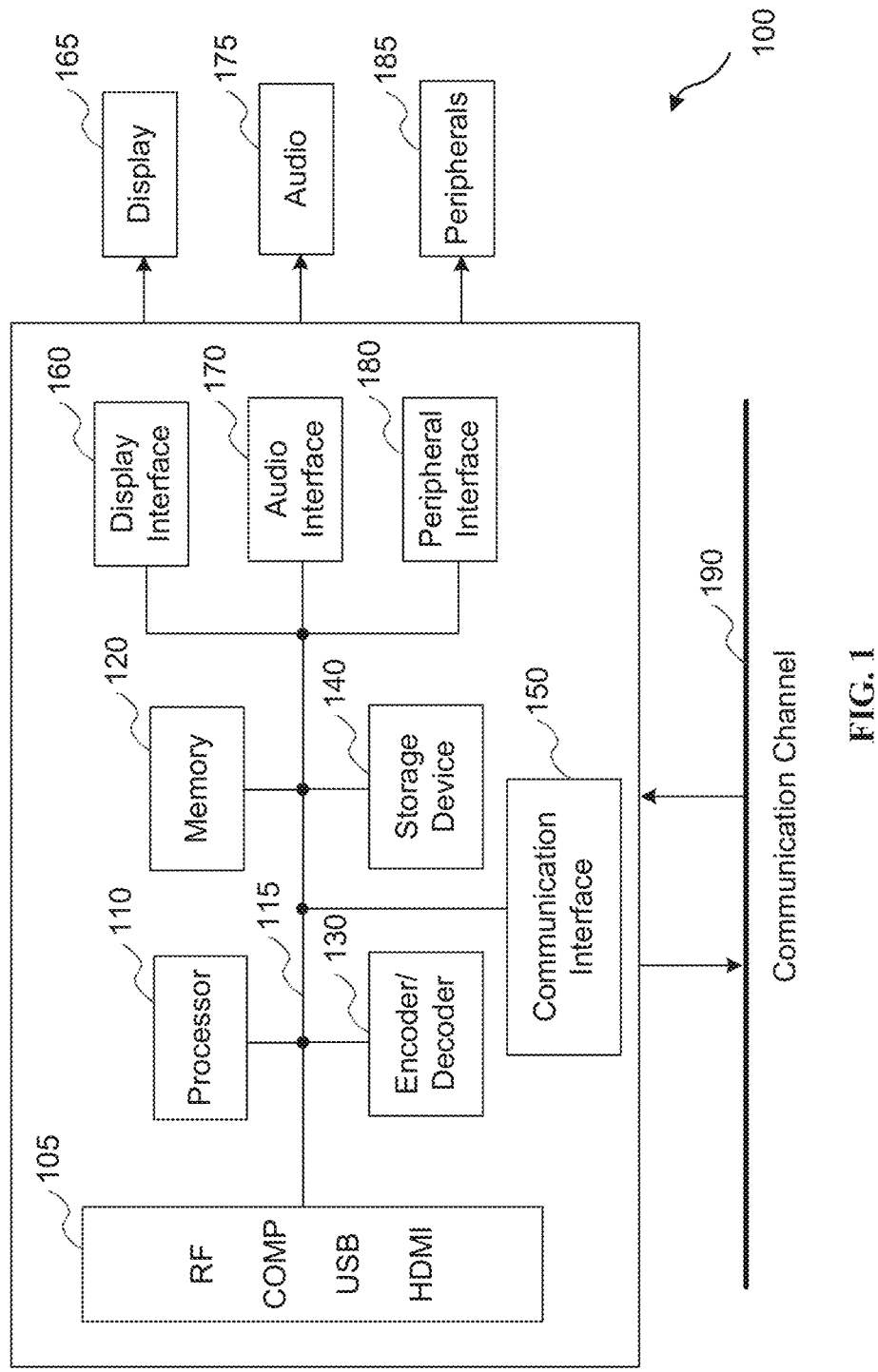
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
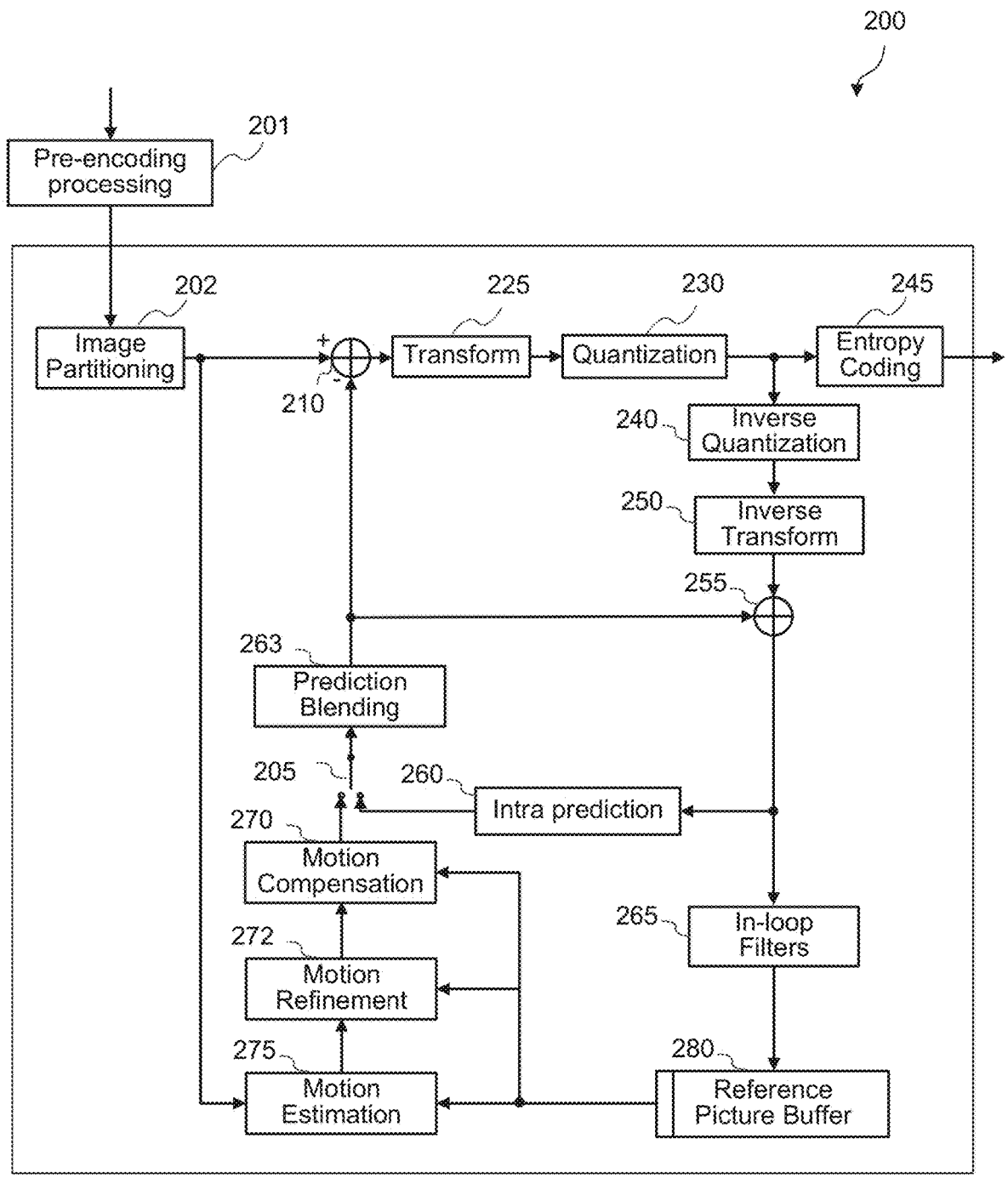
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
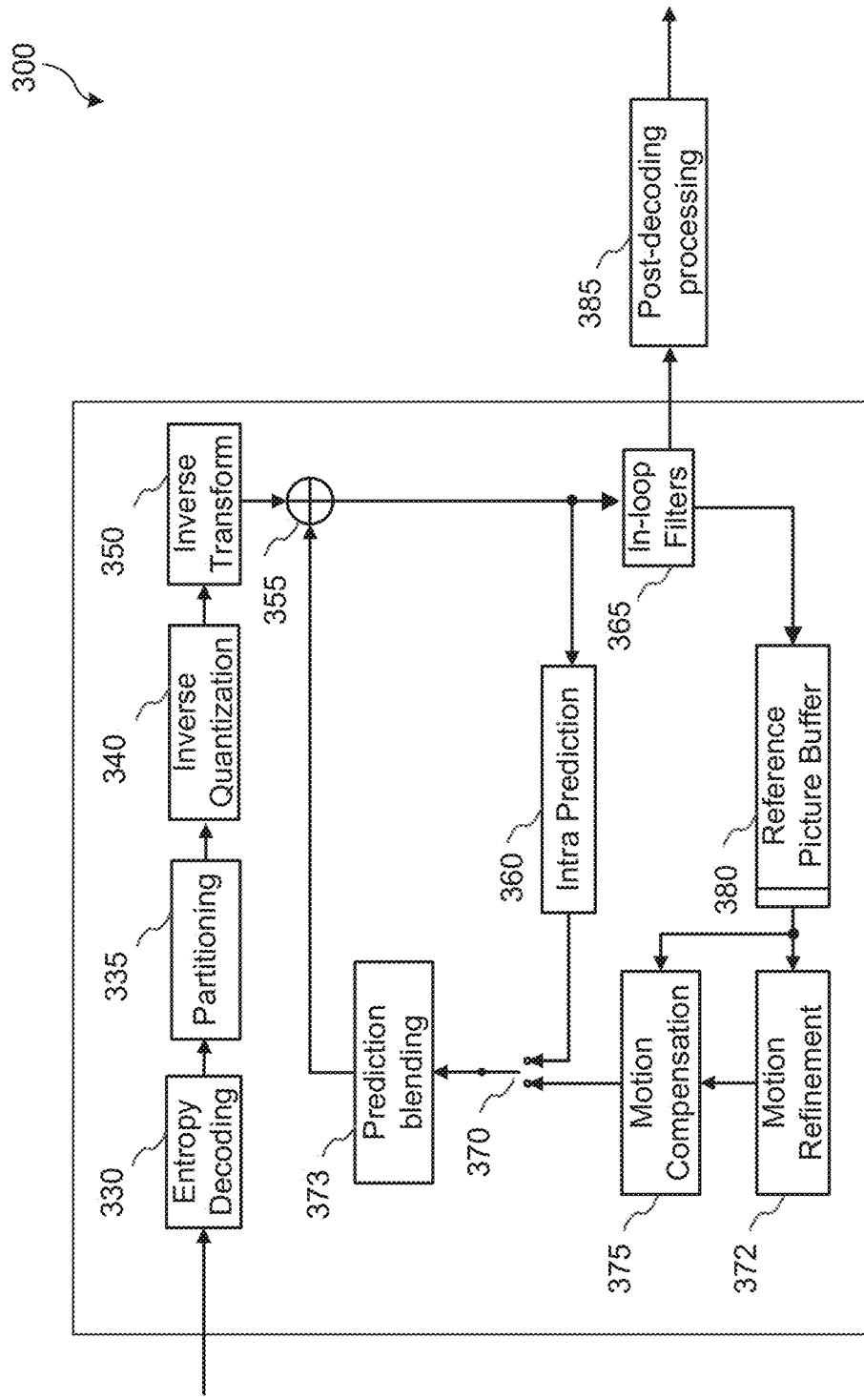
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

As described above, in recent video codecs, such as HEVC or VVC, several filters are applied to the reconstructed samples of the video pictures, aiming at reducing the coding artefacts and reducing the distortion with the original pictures. For instance, in HEVC, a deblocking filter (DBF) and a sample-adaptive offset (SAO) filter are applied successively to the reconstructed samples. In VVC, another filter named adaptive loop filter (ALF) is applied at the very end of the process. During the development phase of VVC, several other supplemental block-based filters were considered: bilateral filter (BF), Hadamard filter and Diffusion filter.

Figure 4:
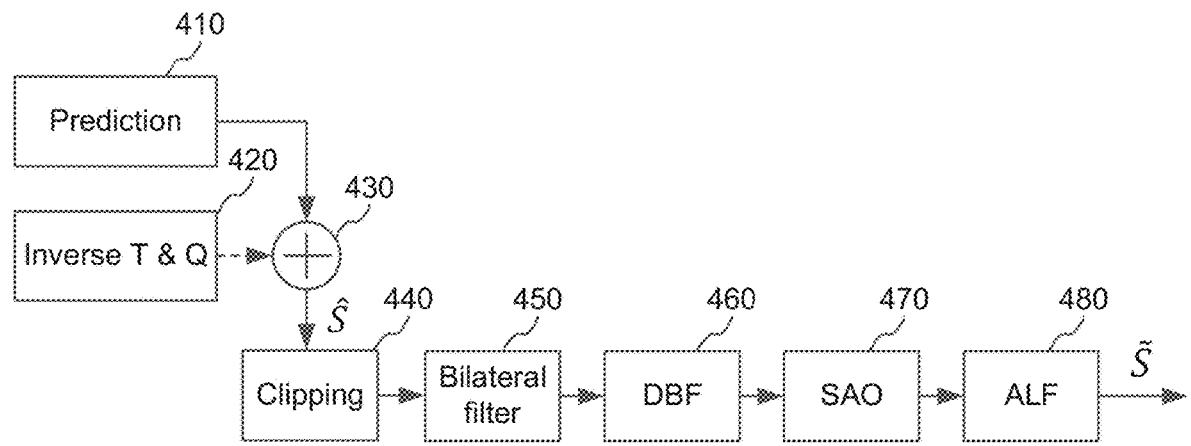
FIG. 4 illustrates an example of successive loop filtering.

FIG. 4 illustrates an example of successive loop filtering. In this example, four successive filters are applied: Bilateral filter (450), DBF (460), SAO (470) and ALF (480). The output is the reconstructed picture samples. For ease of notation, we refer to the input to the encoder as S, input to in-loop filtering as $\hat{S}$, and output of in-loop filtering as $\tilde{S}$. $\hat{S}$ may also be referred to as an initial reconstruction or an initial version of reconstructed samples. As shown in FIG. 4, the input to in-loop filtering is the sum (430) of predicted samples (410) and the decoded/reconstructed prediction residuals (420), which may be clipped (440) to be within the dynamic range supported by the encoder/decoder. For certain blocks, when prediction residuals are zero or do not exist (e.g., in SKIP mode), the input to in-loop filtering is the predicted samples directly.

These different filters in general performs some or all of the following functions:
1. Pixel classification.
2. Encoder only: determination of filter parameters (e.g., DBF, SAO, ALF but not BF).
3. Encoding/decoding filter parameters (e.g., DBF, SAO, ALF but not BF).
4. Class-dependent filtering.

SAO Filter

In HEVC and VVC, SAO is a sample-based filtering operation on a CTU (Coding Tree Unit) basis that allows to add offsets to some categories of reconstructed samples to reduce coding artefacts. A CTU is composed of one CTB per component. SAO can be activated or deactivated per CTB. Two SAO modes are specified: edge offset (EO) and band offset (BO). For EO, the sample classification is based on local directional structures in the picture to be filtered. For BO, the sample classification is based on sample values. The parameters for EO or BO may be explicitly coded or derived from the neighborhood. SAO can be applied to the luma and chroma components, where the SAO mode is the same for Cb and Cr components. The SAO parameters are configured individually for each color component.

Edge Offset

Figure 5:
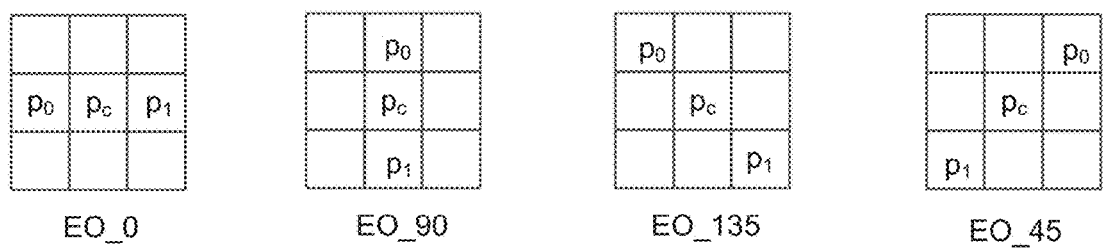
FIG. 5 is a pictorial example illustrating four 1-D directional patterns for EO (Edge Offset) sample classification.

EO uses four 1-D directional patterns: horizontal, vertical, 135° diagonal, and 45° diagonal, as shown in FIG. 5, for sample classification, where label "$p_c$" represents a current sample and labels "$p_0$" and "$p_1$" represent two neighboring samples. Four EO classes are specified based on the directions, and each EO class corresponds to one direction. The selected EO class is signaled in the bitstream as side information.

TABLE 1

| Category | Condition | Meaning |
|---|---|---|
| 1 | $p_c < p_0$ and $p_c < p_1$ | full valley |
| 2 | $p_c < p_0$ and $p_c == p_1$ or $p_c == p_0$ and $p_c < p_1$ | half valley |
| 3 | $p_c > p_0$ and $p_c == p_1$ or $p_c == p_0$ and $p_c > p_1$ | half peak |

TABLE 1-continued

| Category | Condition | Meaning |
| --- | --- | --- |
| 4 | $p_c > p_0$ and $p_c > p_1$ | full peak |
| 0 | None of the above | plain |

Figure 6:
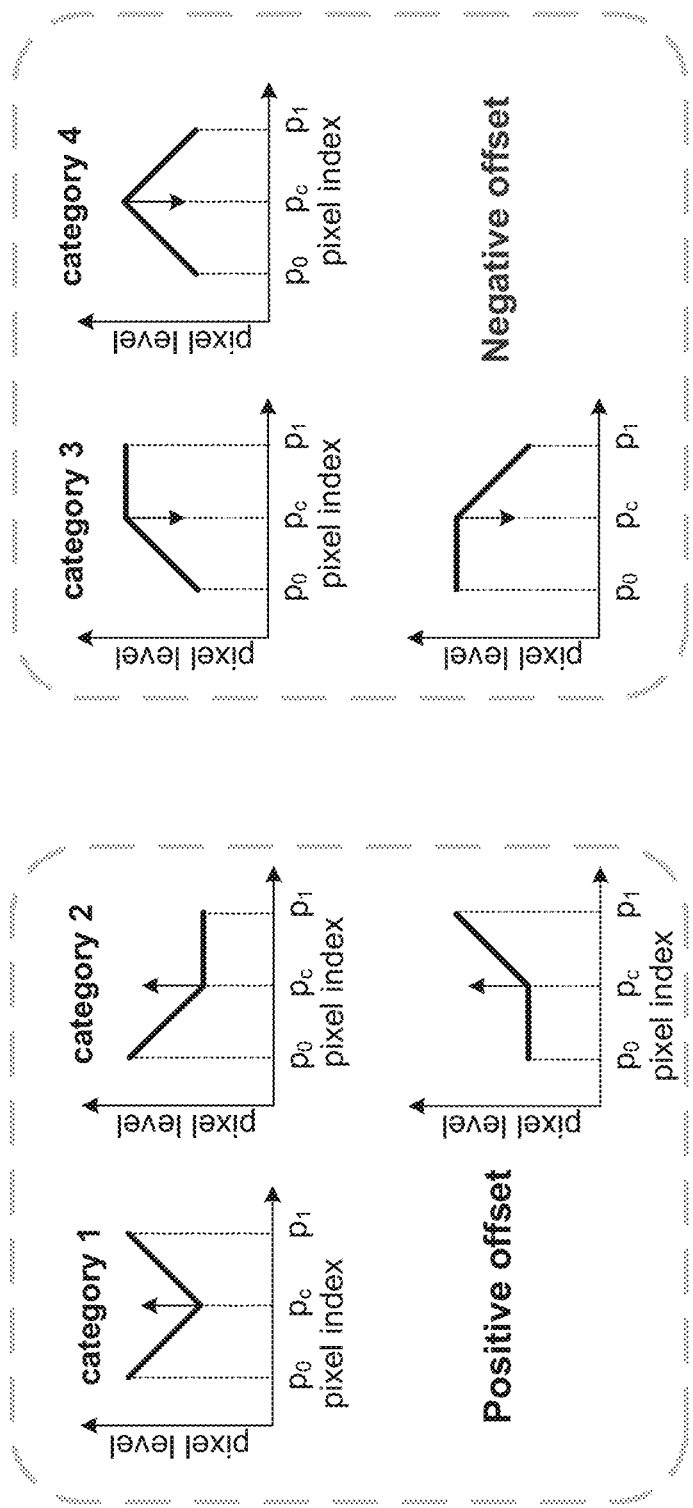
FIG. 6 a pictorial example illustrating that positive offsets are used for categories 1 and 2, and negative offsets are used for categories 3 and 4 of EO classification.

For a given EO class, each sample inside the CTB is classified into one of five (NC=5) categories based on local gradients. Specifically, the current sample value, labeled as "$p_c$," is compared with its two neighbors along the selected 1-D direction. The categorization rules for a sample are summarized in TABLE 1. As also shown in FIG. 6, categories 1 and 4 are associated with a local valley and a local peak along the selected 1-D pattern, respectively, categories 2 and 3 are associated with concave and convex corners along the selected 1-D pattern, respectively. If the current sample value does not belong to categories 1-4 (i.e., the current sample value is the same as its two neighbors, or if $p_0 < p_c < p_1$ or $p_0 > p_c > p_1$), then it is in category 0 and SAO is not applied (i.e., offset is 0). For categories 1-4, offsets are encoded.

Band Offset

Figure 7:
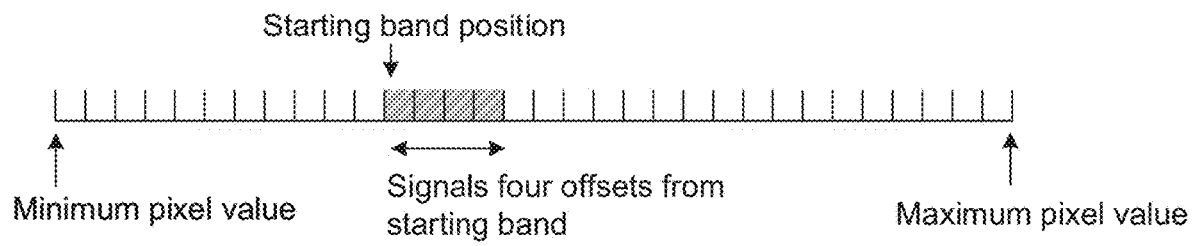
FIG. 7 is a pictorial example illustrating BO (Band Offset) with the associated starting band position and offsets of four consecutive bands.

For BO, the range of sample values (for example, 0-255 in 8-bit) is uniformly split into 32 bands and the sample values belonging to (NC−1)=4 consecutive bands are modified by adding an offset, off(n), n=1, . . . , 4, as shown in FIG. 7. Only offsets of four consecutive bands and the starting band position are signaled to the decoder. The starting band position indicates the position of the first band with an encoded offset. One offset is coded for each of the (NC−1) bands and the remaining bands have an offset equal to zero.

Figure 8:
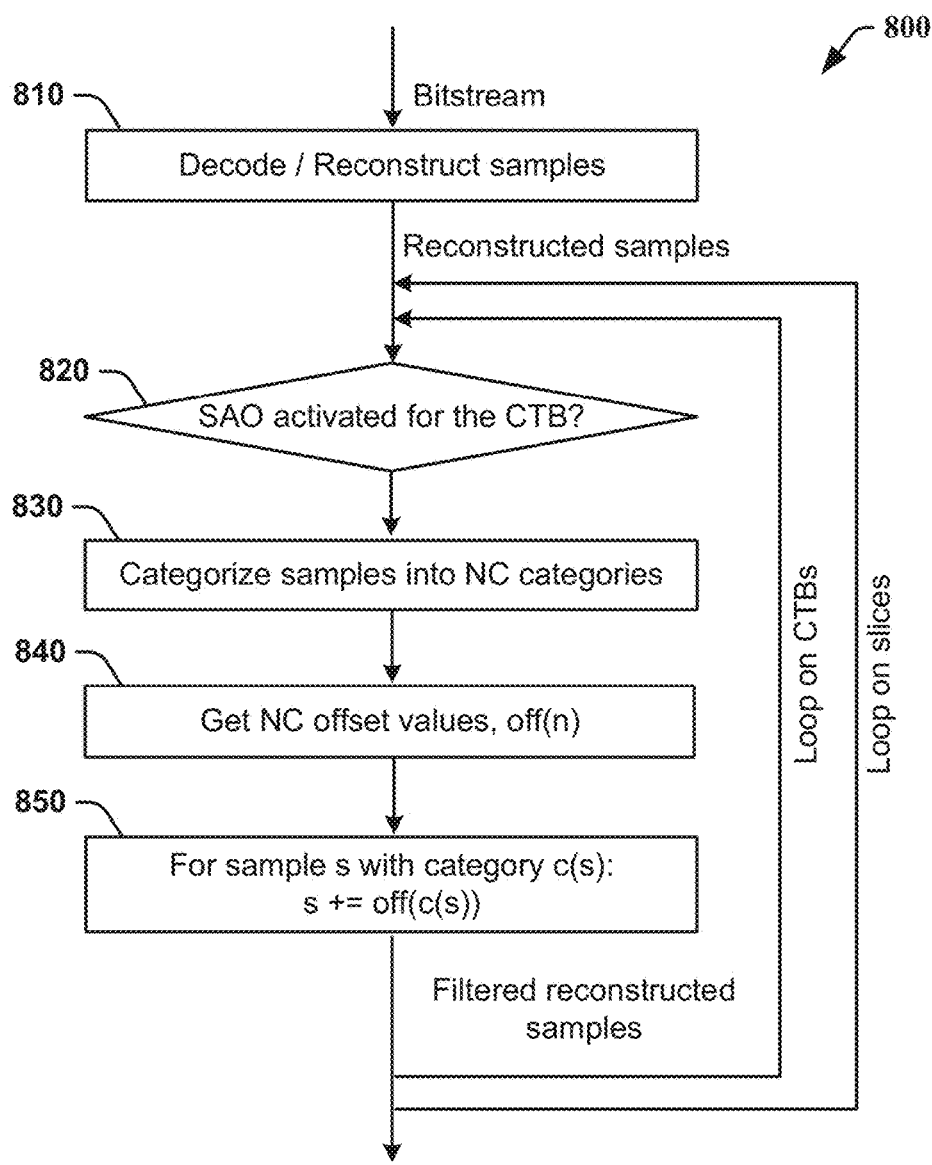
FIG. 8 illustrates an exemplary method for decoding a bitstream using SAO.

In case of EO or BO, it is possible that the offsets are not coded but copied from the neighboring above or left CTU (merge mode). In an example, FIG. 8 illustrates method 800 for decoding a bitstream using SAO. After the bitstream is decoded (810), the reconstructed samples are further filtered using SAO. It should be noted that the term "decoded" or "reconstructed" may mean that a bitstream is partially "decoded," for example, the signals obtained after deblocking filtering but before SAO filtering, and the reconstructed samples may be different from the final decoded output that is used for display.

If SAO is activated for a slice, the decoder checks (820) whether SAO is activated for the current CTB. If SAO is activated, the decoder categorizes (830) samples in the CTB into NC=5 categories. The offset values for each category, off(n), can be obtained (840). At step 850, for sample s with category c(s), the sample can be adjusted to s=s+off(c(s)). As discussed above, sample offsets may be 0 and the corresponding samples are not adjusted. If there are other in-loop filters after the SAO filter, the filtered samples go through more filtering. The filtered reconstructed samples are used as the final output of the decoder.

The encoder may perform a similar process as method 800. At the encoder side, step 810 is implemented to obtain the reconstructed samples, for example, the SAO filtering process uses the reconstructed samples from the deblocking filter as input. The offset values are encoded in the bitstream. The filtered reconstructed samples can be used as references for other pictures.

At the encoding stage, the offset can be decided by collecting for each category c of each class the sum of the difference between the original (target) sample value and the reconstructed sample value diff(c). Denote N(c) as the number of samples of the current block that belong to category c, then the average offset off(c) to be added to the reconstructed samples can be derived as:

$$\text{off}(c) = \text{diff}(c)/N(c) \qquad \text{(eq. 1)}$$

Deep Learned Filters

Figure 9:
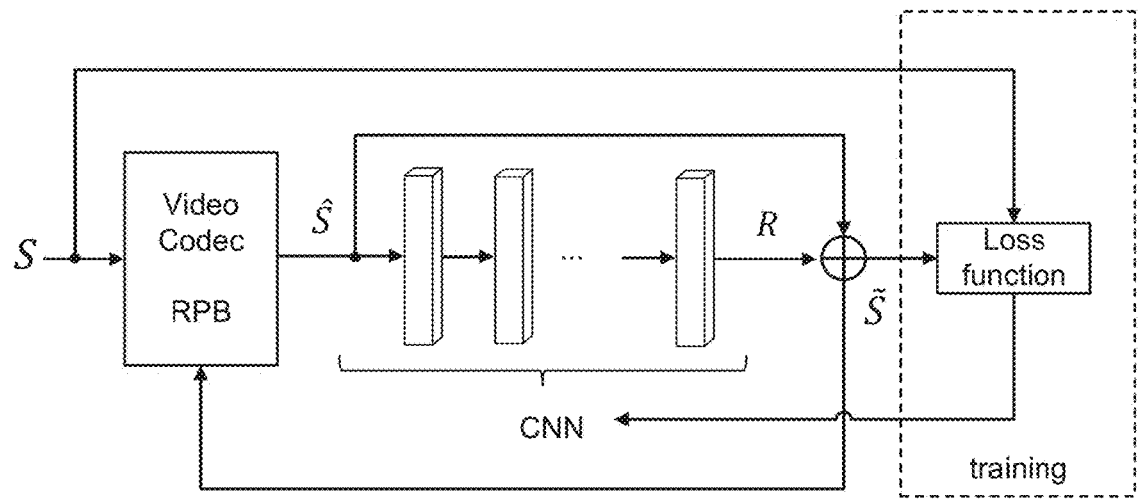
FIG. 9 illustrates an example of using a Convolutional Neural Network (CNN) to restore images after reconstruction.

FIG. 9 illustrates an example of using a Convolutional Neural Network (CNN) to restore images after reconstruction. An image S is first reconstructed as Ŝ. The image is restored as S̃ by adding a correction R computed (inferred) by the CNN. During the training of the CNN (determination of CNN parameters), a loss function based on the error between the restored image and the original image is minimized.

In practice, the CNN is usually composed of several convolutional layers followed by an activation layer (for example, a sigmoid, ReLU or Leaky ReLU function) and the loss function may also consider some regularization terms to stabilize the CNN training.

Several techniques for filtering the reconstructed pictures with CNNs have been developed. The main difference between CNNs and fully-connected neural networks lies in that CNNs share weights along the spatial dimensions of its input and its intermediate representations. Given the local statistics of natural images, the CNNs usually need much fewer parameters than fully-connected neural networks to achieve equivalent performance in image restoration for instance. Moreover, the weight sharing makes the number of parameters in a CNN independent of its input size, meaning that a trained CNN can restore images of various sizes.

In one technique, a 3-layer CNN is shared by the luma and chroma components. The parameters of the CNN are trained and then encoded in the bitstreams with the first I-picture of each random-access segment (RAS). The training uses only pictures of temporal levels 0 and 1. A multi-level on/off control is applied at picture, coding tree block (CTB), and 32×32 block levels for each color component. In a variant, three different 2-layer CNNs for luma and three different 2-layer CNNs for chroma are encoded. The index of the best CNN to use for each of luma and chroma is signaled per CTB. The CNNs are compressed to 6-bits per weight. The on/off control is performed per tile.

These methods encode all the neural network parameters in the bitstream, which creates signaling overhead. Moreover, the neural networks should be trained per group of pictures (RAS), which may lead to unacceptable complexity/latency practically.

In another technique, to overcome the aforementioned limitation, a set of bigger but fixed neural network parameters are trained once, one per QP. The three input components (Y, U, V) are concatenated to be processed together by the CNN. The input sample blocks are padded with a certain size of pixels corresponding to the total padding size of CNN during training. The number of parameters may be even reduced by repeating some layers.

The present application proposes an in-loop filter based on neural networks (NN) that may replace one or several existing in-loop filters, or may be added to the existing in-loop filters. Since the proposed filter adjusts the samples with adaptive offsets as in HEVC or VVC SAO filters, we denote the proposed filter as an NN-based SAO (Sample Adaptive Offset) filter. In one embodiment, an NN-based filter adjusts the reconstructed samples by offsets as performed in SAO filters. In particular, the NN filter determines a weight mask. A weight in this mask corresponds to either the decision of whether a sample of the reconstructed block is corrected or the strength of the correction of this sample, depending on the value of this weight. The NN filter is controlled with few parameters (offset) to control the strength of the filter. These parameters are encoded in the bitstream.

NN-Based In-Loop Filter Architecture

Figure 10:
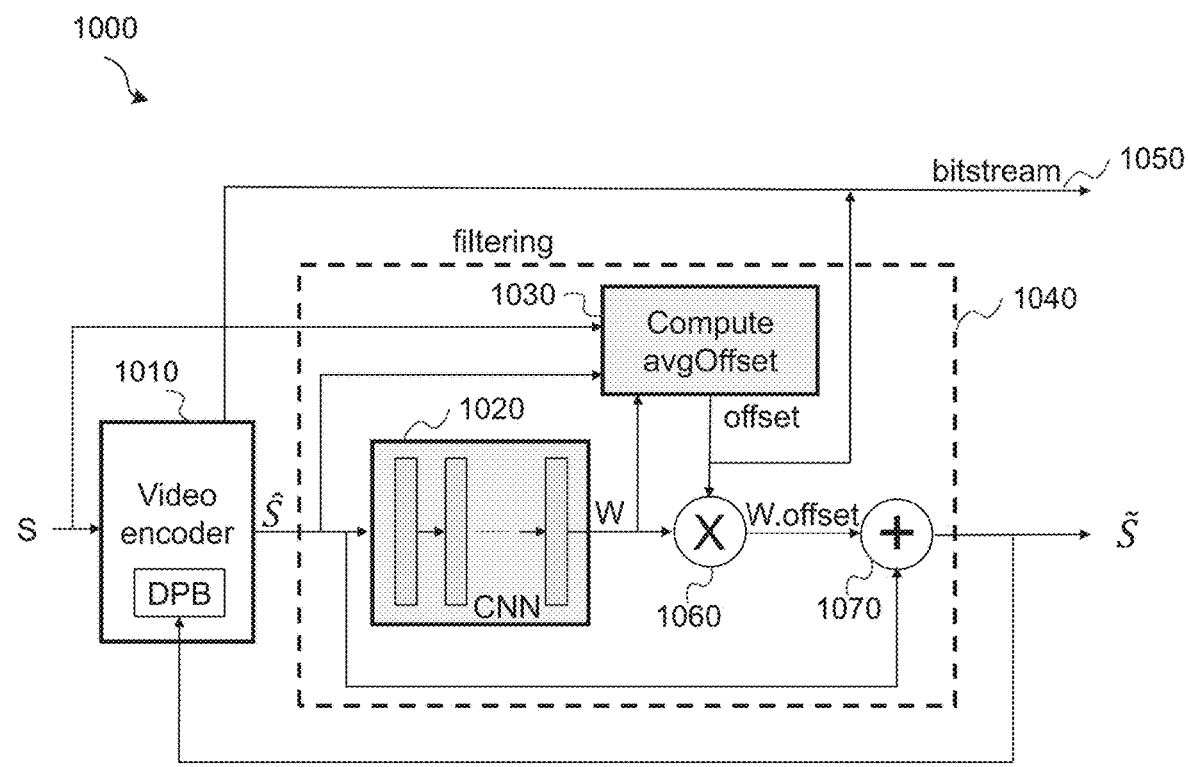
FIG. 10 illustrates an encoder architecture according to an embodiment.

FIG. 10 illustrates an encoder architecture (1000) according to an embodiment. Here, W represents a weight mask. If the weights are binary, i.e., either 0 or 1, the mask weight of index i decides whether the sample of Ŝ of index i is corrected. If the weights are non-binary, e.g., floats, the absolute value of the weight of index i can be viewed as the strength of the correction for the sample of Ŝ of index i. The term offset represents the control parameter for the strength of the filter correction.

When the first layer(s) of the NN are convolutional layers, the sets of data {S, Ŝ, W} are typically blocks (or matrices) of the same size. However, they can be re-arranged into 1-D or N-D vectors. Appropriate padding may be added at layers input or output to guarantee that the size of W is the same as the size of Ŝ. Alternatively, the input block Ŝ may be larger than W to consider the reduction from the first layer(s).

For a block S to be encoded by the video encoder module (1010), the corresponding (local) reconstructed block is Ŝ. The video encoder (1010) may correspond to encoder 200, except the in-loop filter (265) that is extended or replaced with the proposed filter (1040). The NN (1020) is typically composed of several convolutional layers, but may be composed of fully connected and/or short cut links for example. Its input is the reconstructed block to be filtered and the output is the weight mask W.

The filter control parameter "offset" is derived (1030) from {S, Ŝ, W} as follows:

offset=sum(W·(S−Ŝ))/sum(W)  (eq. 2)

where: "." denotes the simple term by term product (T=W·S means $t_{i,j}=w_{i,j} \times s_{i,j}$), sum(W) denotes the sum of all the terms of W: sum(W)=$\Sigma_{i,j} w_{i,j}$.

In a variant, the filter control parameter "offset" is derived (1030) from {S, Ŝ, W} with mean squared error minimization method as follows:

offset=sum(W·(S−Ŝ))/sum(W²)  (eq. 2b)

where sum(W²) denotes the sum of all the squared terms of W: sum(W²)=$\Sigma_{i,j} w_{i,j}^2$.

The value of "offset" is encoded in the bitstream for each block (1050). In a variant, the value "offset" is quantized before coding. The operations "X" (1060) and "+" (1070) correspond to the product of all the terms of W by the scalar value "offset" and the sum term by term respectively. Because "offset" is used to scale the weight mask W, the offset may also be considered as a scaling parameter. In a variant, the values of W are clipped, for example between −1 and 1.

Figure 12:
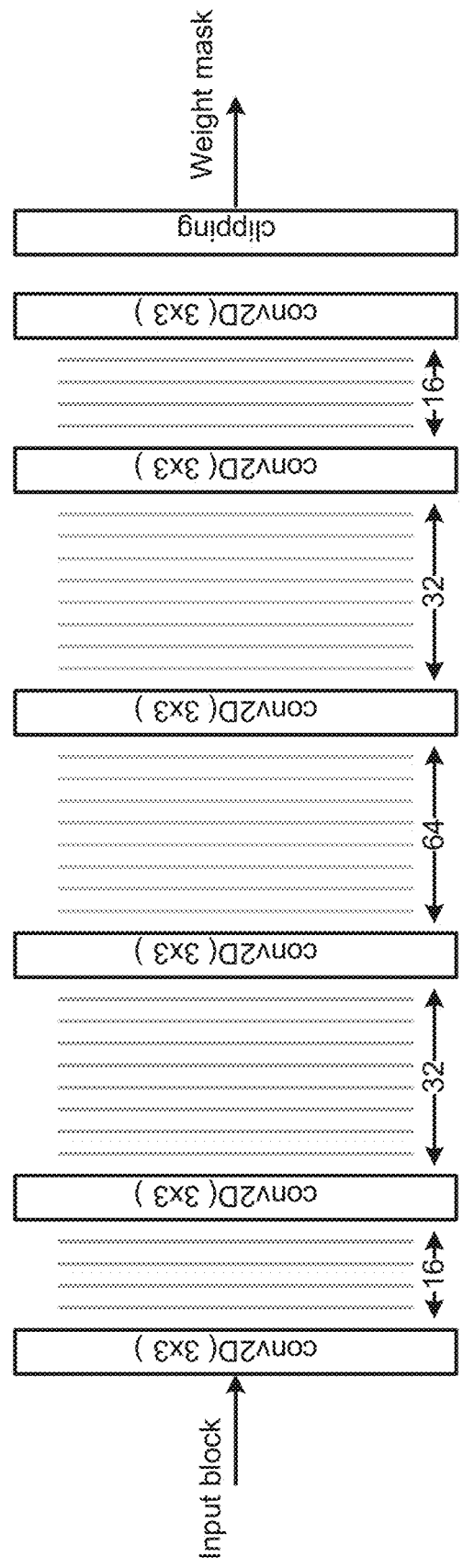
FIG. 12 illustrates an example of an NN used in the filter, according to an embodiment.
Figure 28:
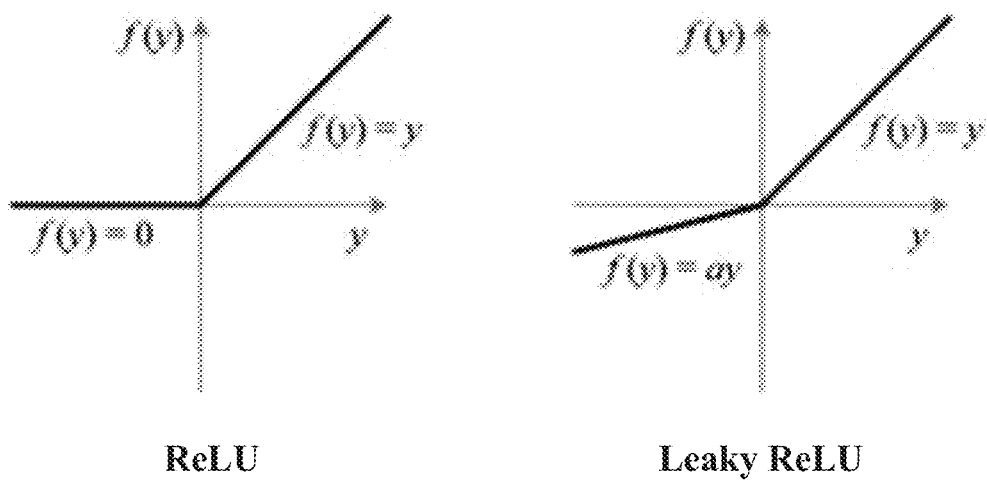
FIG. 28 illustrates two examples of activation functions: ReLU and Leaky ReLU.

FIGS. 11(a), 11(b) and 11(c) illustrate a portion of the initial reconstructed picture to be filtered, the corresponding weight masks from the NN, and the filtered result, respectively. Here, a six-layer CNN is used, as shown in FIG. 12, with ReLU activation and one final clipping layer. In FIG. 11(b), different shades correspond to different weight values. Alternatively, one can use other activation function such as the Leaky-ReLU as depicted in FIG. 28 with alpha parameter equal to 0.1 for instance. Leaky-ReLU activation function has two merits. First it facilitates the error backpropagation algorithm hence convergence at the NN training stage; and second it allows negative weight mask values. In a variant, one uses Leaky-ReLU for internal layers and ReLU for the last layer only.

Using a block as an example, pixel values are:

$$S = \begin{bmatrix} 448 & 544 & 412 & 228 \\ 464 & 484 & 556 & 412 \\ 472 & 460 & 480 & 544 \\ 468 & 468 & 456 & 488 \end{bmatrix}, \hat{S} = \begin{bmatrix} 513 & 541 & 396 & 234 \\ 460 & 511 & 552 & 409 \\ 451 & 453 & 509 & 556 \\ 461 & 455 & 462 & 517 \end{bmatrix}$$

The weight mask is $$W = \begin{bmatrix} 0.000 & 0.884 & 1.000 & 0.000 \\ 0.390 & 0.000 & 0.428 & 0.000 \\ 0.716 & 1.000 & 0.000 & 0.164 \\ 0.000 & 0.000 & 0.000 & 0.000 \end{bmatrix}$$

The offset for the block computed with (eq. 2) is 6. Thus, $$W.\text{offsest} = \begin{bmatrix} 0 & 5 & 6 & 0 \\ 2 & 0 & 2 & 0 \\ 4 & 6 & 0 & 1 \\ 0 & 0 & 0 & 0 \end{bmatrix}$$

The filtered result is $$\tilde{S} = \hat{S} + W.\text{offset} = \begin{bmatrix} 513 & 546 & 402 & 234 \\ 462 & 511 & 554 & 409 \\ 455 & 459 & 509 & 557 \\ 461 & 455 & 462 & 517 \end{bmatrix}.$$

If using (eq. 2b), the offset for the block is 8. Thus, $$W.\text{offsest} = \begin{bmatrix} 0 & 7 & 8 & 0 \\ 3 & 0 & 3 & 0 \\ 5 & 8 & 0 & 1 \\ 0 & 0 & 0 & 0 \end{bmatrix}$$

The filtered result is $$\tilde{S} = \hat{S} + W.\text{offset} = \begin{bmatrix} 513 & 548 & 404 & 234 \\ 463 & 511 & 555 & 409 \\ 456 & 461 & 509 & 557 \\ 461 & 455 & 462 & 517 \end{bmatrix}.$$

Figure 13:
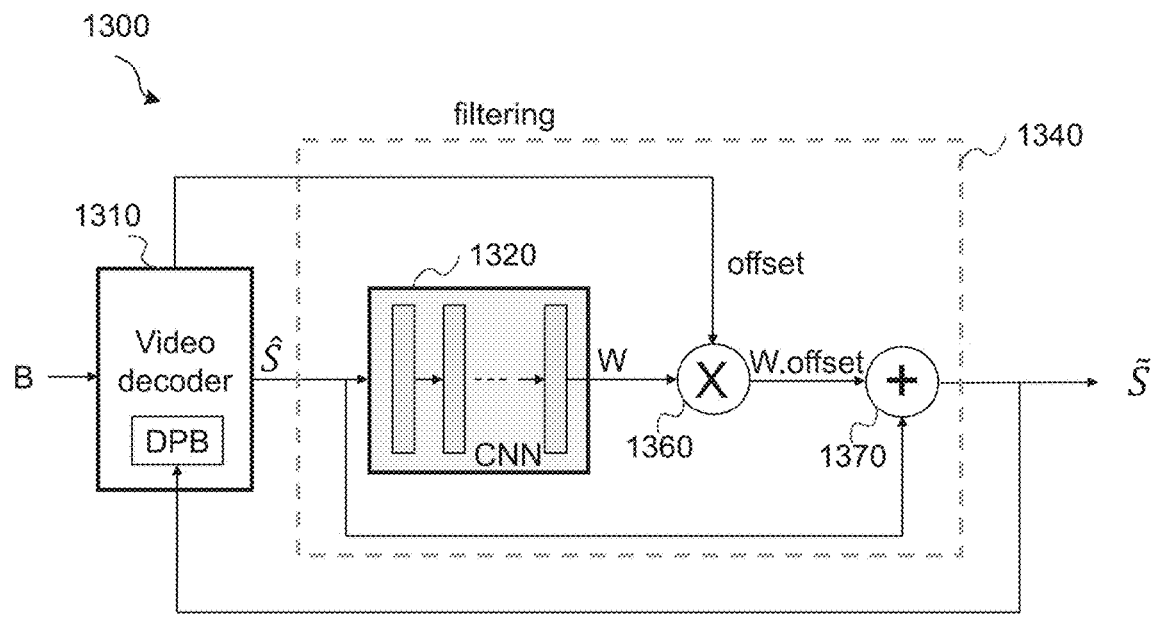
FIG. 13 illustrates a decoder architecture according to an embodiment.

FIG. 13 illustrates a decoder architecture (1300) according to an embodiment. The input of the decoder includes a bitstream, for example, one generated by encoder 1000. The video decoder module (1310) may correspond to decoder 300, except the in-loop filter (365) that is extended or replaced with the proposed filter (1340). The NN (1320) should be the same as the one used in a corresponding encoder in order to properly decode the bitstream. The input to the NN (1320) is the reconstructed block to be filtered and the output is the weight mask W. The output of the NN filter (1320) may be the scaled offsets (residuals) for correcting one component (1 channel) or more, e.g., luma and chroma residuals samples (3 channels) or 2 chroma residual samples (2 channels), with possibly other information.

Note that the parameters for the NN are known at the decoder and are not conveyed in the bitstream.

The filter control parameter "offset" is decoded (1310) from the bitstream for the block. The control parameter is then multiplied (1360) with the weight mask. Namely, the control parameter is scaled by a weight for each sample in the block in order to generate the scaled offset for each sample. The scaled offset is then added (1370) to the corresponding sample in the initial reconstructed block.

By generating a sample-wise weight mask W, the product W·offset provides the adjustment offset for each sample in the block. Note that here only a single control parameter needs to be conveyed for the block for the filtering process, as the parameters for the NN are not transmitted in the bitstream. Thus, with very little signaling overhead, the proposed filter achieves sample-wise adjustment in filtering which can improve the compression efficiency.

NN-Based Filter Architecture with Pre-Classification

Figure 14:
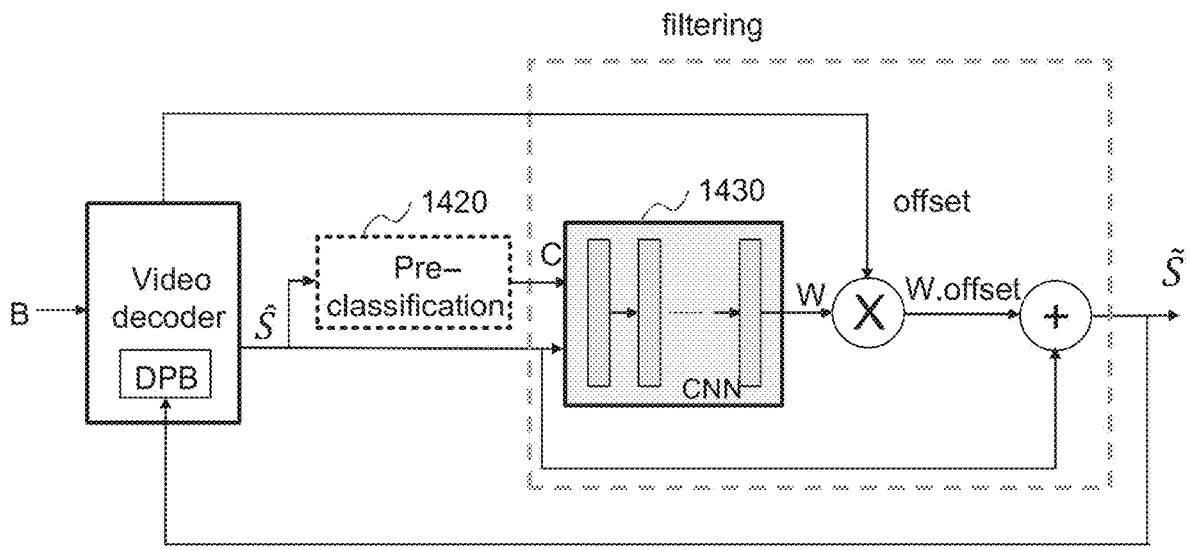
FIG. 14 illustrates an encoder architecture with pre-classification as input to the neural network, according to an embodiment.

In this embodiment, the NN module has additional inputs such as the quantization step (QP), the image type (e.g., type I, P or B), the reconstructed residuals samples or reconstructed samples from another component. In a variant, the additional input is a classification module (1420) that classifies the samples of the blocks as depicted in FIG. 14. In FIG. 14, the module (1420) is illustrated in dashed lines to show it is optional. While a decoder is shown in FIG. 14, a corresponding encoder can be modified accordingly. This classification (1420) can be based on local gradients or other semantic classifications. For example, the classifier is the same as the one used in existing in-loop filters such as HEVC/VVC SAO, ALF classifier or deblocking filter classifier. The classifier may associate to each sample of Ŝ a binary label (0: not in the class, 1: belongs to the class), one integer label among T values $\{c_1, c_2, \ldots c_T\}$, or a non-integer value (e.g., floating point $c_{float}$).

One advantage of using pre-classifier input is that the number of layers of the NN (1430) may be reduced, since the purpose of the first layer(s) is to perform classification in general. However, the use of an a priori explicit classifier may reduce the ability of the training to learn optimal classification.

In-Loop Filter Architecture with Multiple NNs

Figure 15:
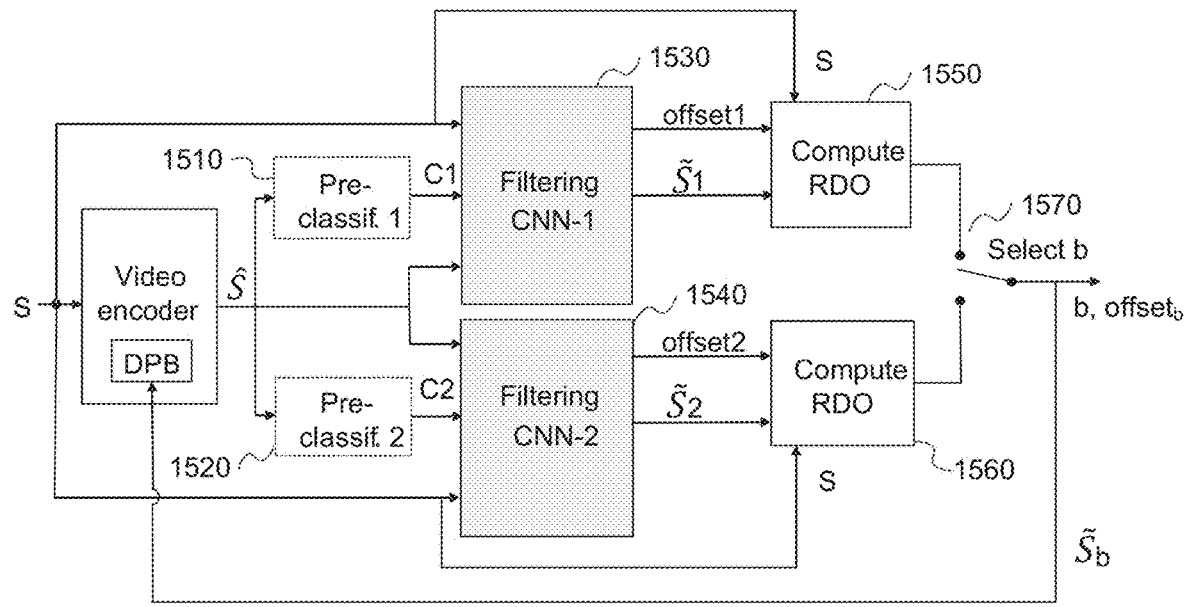
FIG. 15 illustrates an encoder architecture with a plurality of neural network based filters, according to an embodiment.

In this embodiment, several NN filters (1530, 1540) are used as shown in FIG. 15. At the encoder k filters (k is set to 2 in FIG. 15) are applied to generate $\{\widetilde{S_k}, \text{offset}\}_{i=0..k}$. For each block Ŝ, the best filter to use is selected (1570) as the one minimizing the distortion of $\tilde{S}_1$ with S or the one that minimizes the rate-distortion tradeoff (distortion and encoding cost of offset and filter index i, 1550, 1560). Then, filter index b of the selected filter and associated offset$_i$ are encoded in the bitstream explicitly or implicitly via prediction (using previously reconstructed parameters for instance). In a variant, each (or some) of the filtering module (1530, 1540) is preceded with a classifier (1510, 1520) as depicted in FIG. 15 where k=2.

Figure 16:
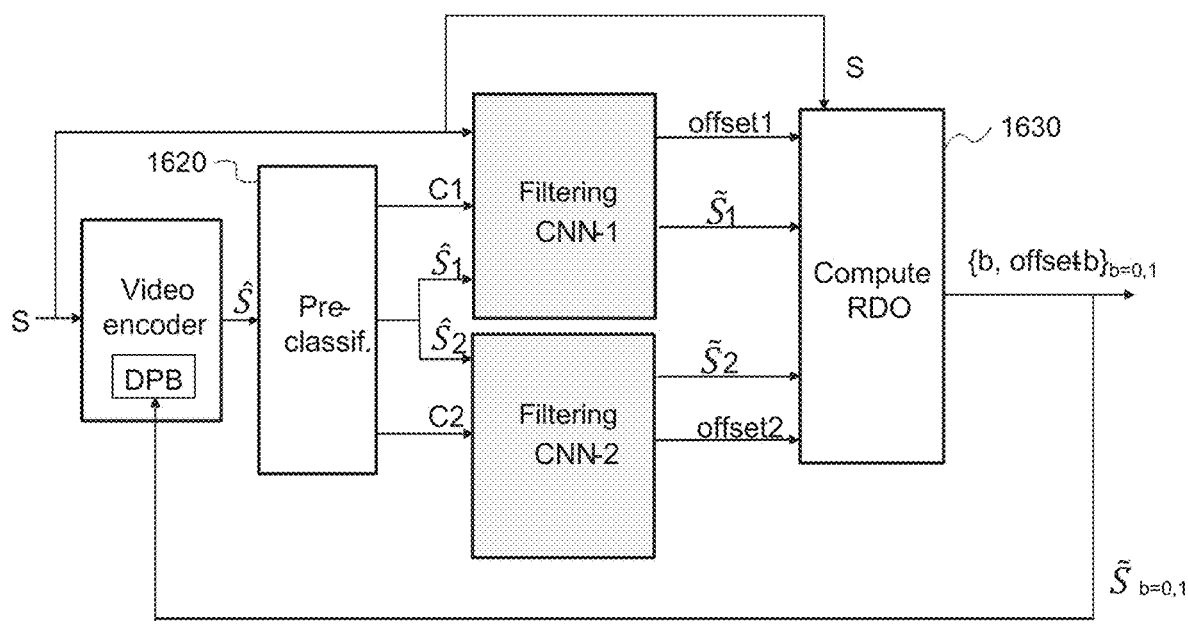
FIG. 16 illustrates an encoder architecture with a plurality of neural network based filters, according to another embodiment.

In another embodiment, as shown in FIG. 16, a single classifier is used (1620) so that each sample in Ŝ is labelled as $C_i$ (i=1, ... k) and may be filtered as $\tilde{S}_1$ respectively. The samples of Ŝ classified as $C_i$ are noted $\hat{S}_1$. In that case, k offsets, offset$_i$ (i=1, ... k), may be signaled in the bitstream. Advantageously, a single RDO module (1630) selects which CNN filter will be used finally. In the example depicted in FIG. 16, the RDO module may finally select b={ }(no filtering), b={0} (category 0 is filtered, category 1 is not filtered), b={1} (category 1 is filtered, category 0 is not filtered) or b={0, 1} (both filters are used). In the last case, both offsets values {offset$_1$, offset$_2$} will be encoded in the bitstream.

Figure 17:
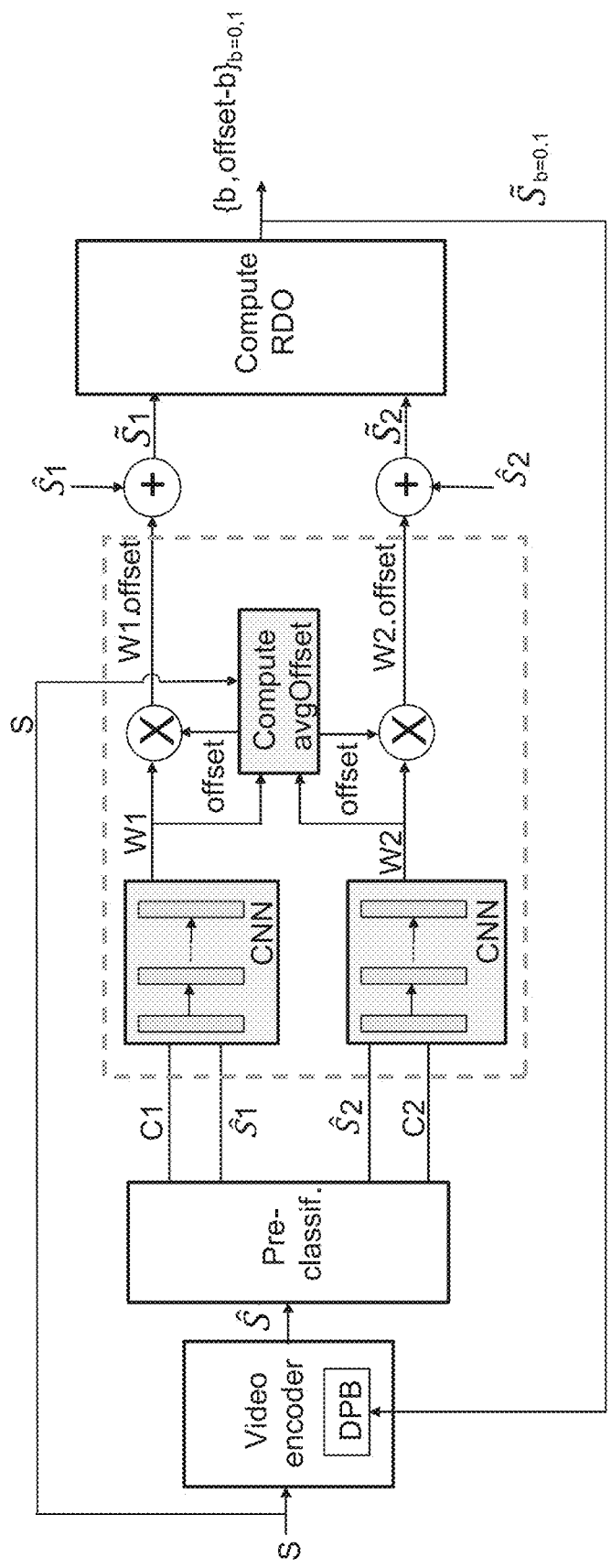
FIG. 17 illustrates an encoder architecture with a plurality of neural network based filters, according to yet another embodiment.

In a variant as depicted in FIG. 17 with k=2, a single offset is computed for all the NN filters.

Figure 18:
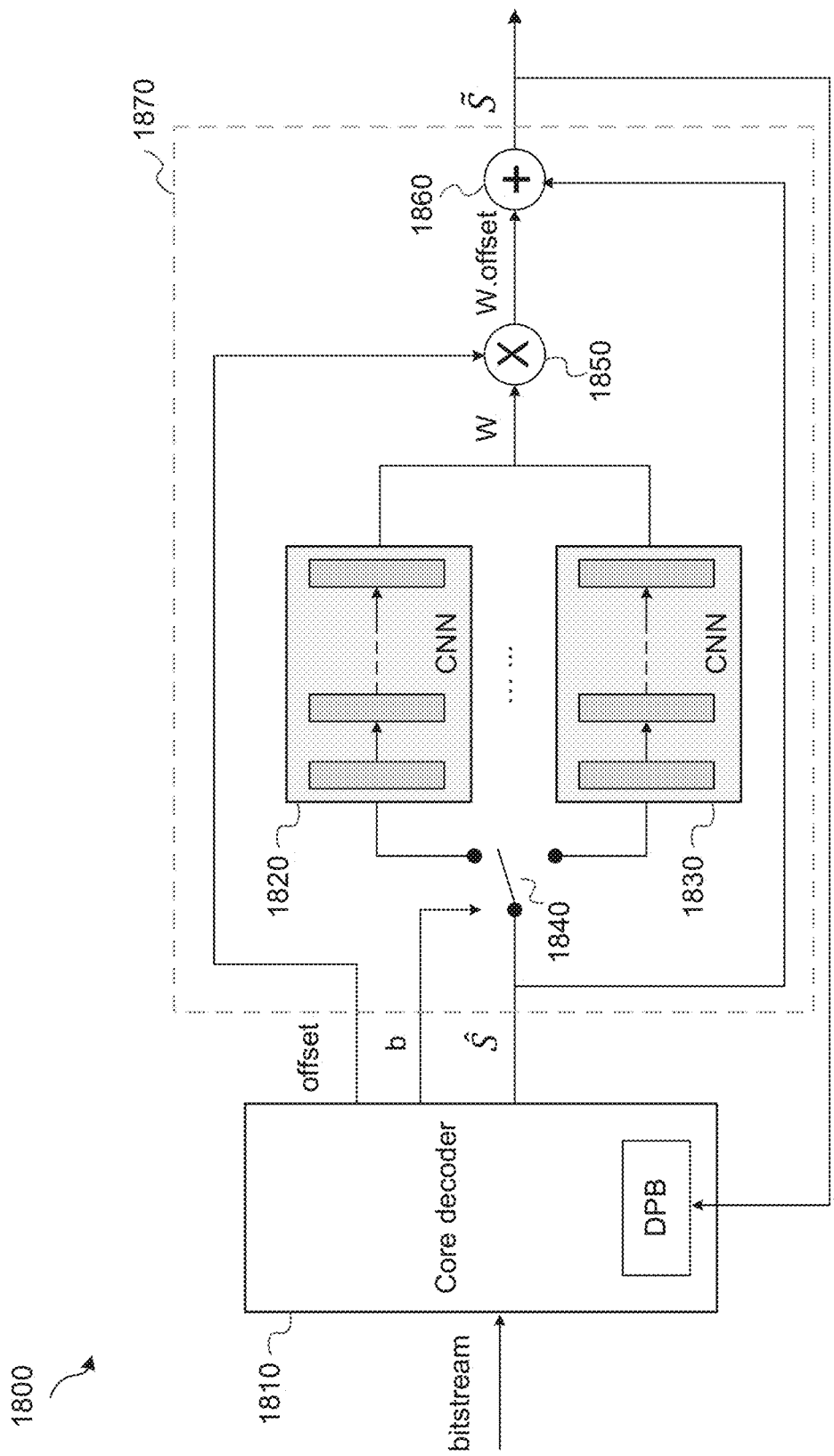
FIG. 18 illustrates a decoder architecture with selection of one CNN among multiple CNNs, according to an embodiment.

FIG. 18 illustrates a decoder architecture (1800) with multiple CNNs according to an embodiment. The input of the decoder includes a bitstream. The video decoder module (1810) may correspond to decoder 300, except the in-loop filter (365) that is extended or replaced with an NN based filter (1870).

The filter control parameters "offset" and filter index "b" are decoded (1810) from the bitstream for the block. The filter index "b" controls (1840) which one of K CNNs (1820, 1830) is to be used for generating the weight mask W. The control parameter "offset" is then multiplied (1850) with the weight mask. The scaled offset is then added (1860) to the corresponding sample in the initial reconstructed block.

In FIG. 18, the CNNs are used without pre-classification. In other embodiments, the pre-classification module as illustrated for the encoder, for example, in FIGS. 15-16, can be applied.

In FIG. 18, the selection of the CNN to be used for a block and the control parameter "offset" allows tailoring the filtering process to the local characteristics of the current block. However, it may happen that two or more CNNs may both provide good correction, then the choice of a single CNN may not be optimal because it may be preferred to cumulate the benefit of the two or more CNNs in some way. This may depend also on the way the CNNs have been trained.

In the following, several methods are described to leverage the power of CNNs by combining their outputs rather than selecting the best one. In one example, we assume there are several (N) NNs that may have been trained separately with different datasets, with different characteristics and/or encoded with different parameters (e.g., different QP values, different picture sizes or sample resolutions) for example. One could also use dataset composed of reconstructed samples from regular bitstream and classify the CTU with the decoded SAO type.

Mutual Combination of NNs

The neural network ensemble is a learning paradigm where multiple neural networks are jointly used to solve a problem. In this embodiment, we apply this general principle to the NN based filter, through a weighted linear combination of several NN outputs.

Figure 19:
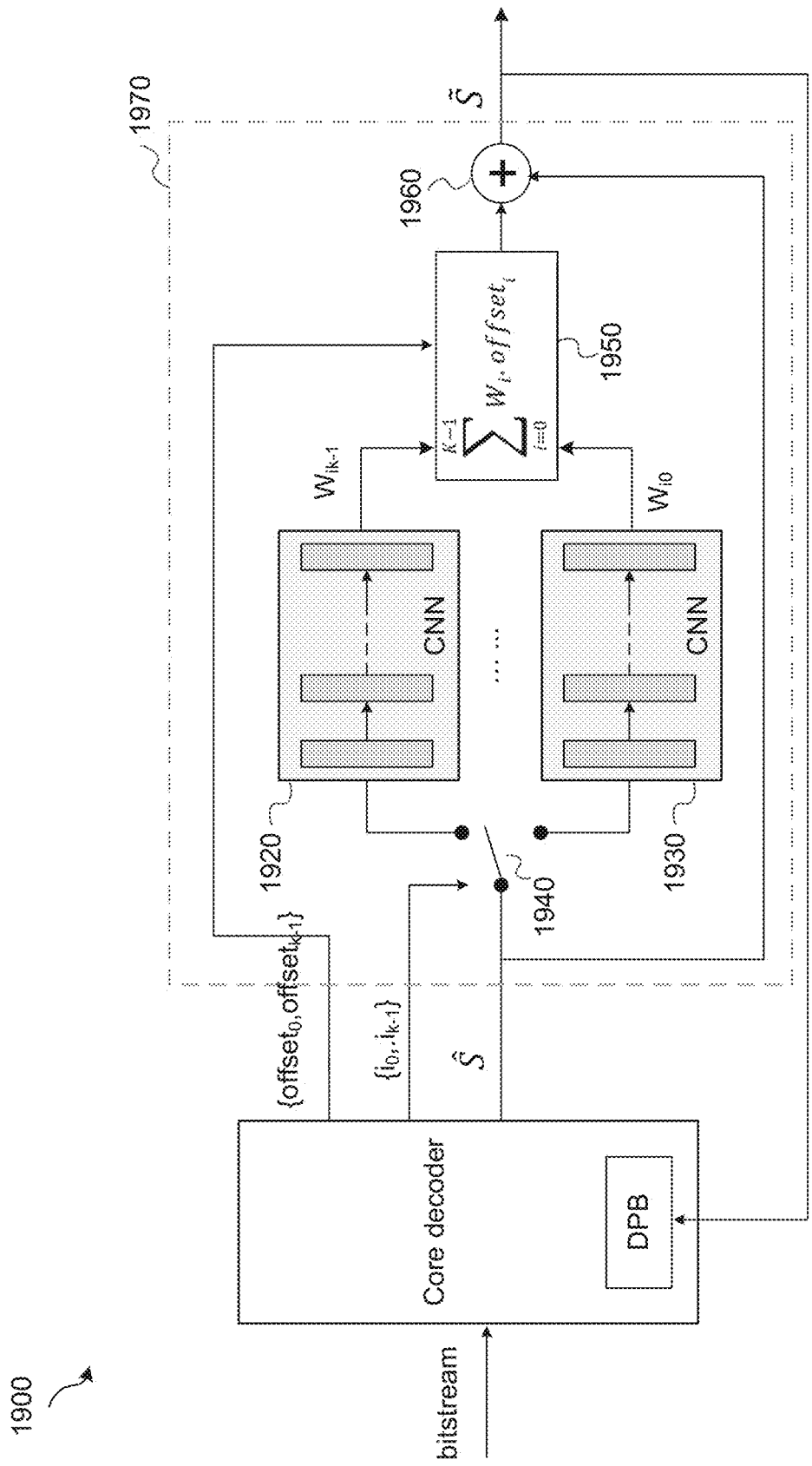
FIG. 19 illustrates a decoder architecture with selection of several CNNs among multiple CNNs, according to another embodiment.

FIG. 19 illustrates a decoding process (1900) that uses multiple NNs for correction according to an embodiment. The decoder decodes K filter indexes $\{i_0, \ldots i_{k-1}\}$ allowing to select (1940) K filters among N available NNs, and K offsets $\{\text{offset}_0, \ldots \text{offset}_{k-1}\}$. In this example, K=2 corresponding to the NNs (1920, 1930). The inputs to the K NNs are the reconstructed block Ŝ and possibly additional information such as QP, coding mode or samples of other components. The outputs of the K NNs are the weight masks $\{W_i\}_{i=0, \ldots K-1}$. Next, the K weight masks and the K offsets are combined (mutual combination) (1950) using a weighted linear combination of the weight masks and offsets to derive the additive correction Corr(x) to be applied (1960) to the reconstructed samples Ŝ(x), where "x" denote the sample at position "x" in the block, as follows:

$$\text{Corr}(x) = \Sigma_{i=0}^{K-1} W_i \cdot \text{offset}_i.$$

Figure 20:
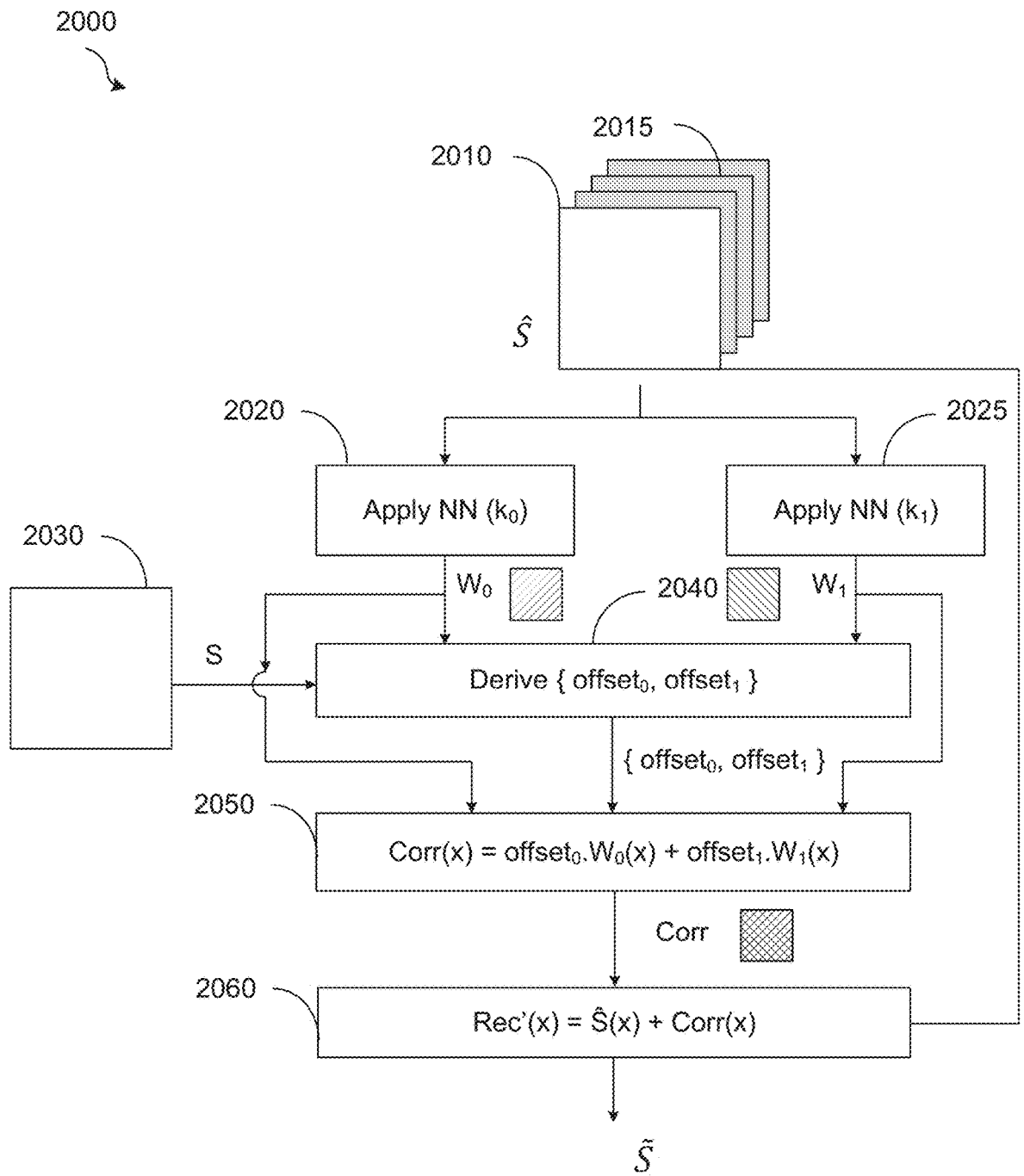
FIG. 20 illustrates an encoding process that uses multiple NNs for correction, according to an embodiment.

FIG. 20 illustrates an encoding process (2000) that uses multiple NNs for correction, according to an embodiment. The encoder selects K NNs among N available NNs. In this example, K=2. More generally, the process can be applied when there are more than one NNs (2020, 2025) used in the filter. The inputs to the K NNs are the reconstructed block and possibly additional information such as QP, coding mode, reconstructed residuals or reconstructed samples of other components (2015). Note that the value of K may be different for luma or chroma NN-based filters, e.g., if luma and chroma do not share same filter.

For a given reconstructed block Ŝ (2010, e.g., CTU or CU), let us denote $W_k$ and $\text{offset}_k$ the corresponding output obtained with the $k^{th}$ CNN and the associated scaling parameter respectively. Based on the original block S (2030) and the weight masks $W_k$, the scaling parameters $\text{offset}_1$ and $\text{offset}_2$ can be derived (2040). The scaling parameters can be coded per region or per block (CTU or CU) in the bitstream. The mutual combination of the K CNNs allows building the additive correction Corr(x) to be applied to the reconstructed samples Ŝ(x) through a weighted linear combination of the NN outputs (2050), where the weights in the linear combination are the scaling parameters $\text{offset}_k$. The linear combination is illustrated in an example in FIG. 21. Mathematically, the linear combination can be expressed as:

$$\text{Corr}(x) = \sum_k W_k(x).\text{offset}_k$$

Adding the correction term to the initial reconstructed block, the final reconstructed block is generated (2060).

In one embodiment, the derivation of the scaling values ($\text{offset}_k$) can be made at the encoder side using least square minimization (LSM) of the mean squared error (MSE):

$$MSE = \frac{1}{N}\sum_k \left(\hat{S}(x) + \text{Corr}(x) - S(x)\right)^2. \quad (\text{eq.3})$$

For the particular case of using two CNNs, K=0 or 1, the LSM method allows deriving the values of $\text{offset}_0$ and $\text{offset}_1$ as follows:

$$\text{offset}_0 = \frac{BA_1 - C_1A_0}{C_0C_1 - BB} \quad \text{offset}_1 = \frac{BA_0 - C_0A_1}{C_0C_1 - BB}$$

where $A_k = \Sigma_x\ W_k(x)\cdot(\hat{S}(x)-S(x))$, $C_k = \Sigma_x\ w_k(x)\cdot w_k(x)$, $B = \Sigma_x w_0(x)\cdot w_1(x)$, and $\Sigma_x$ denotes the sum on all the samples "x" of the current block.

Figures 21, 22:
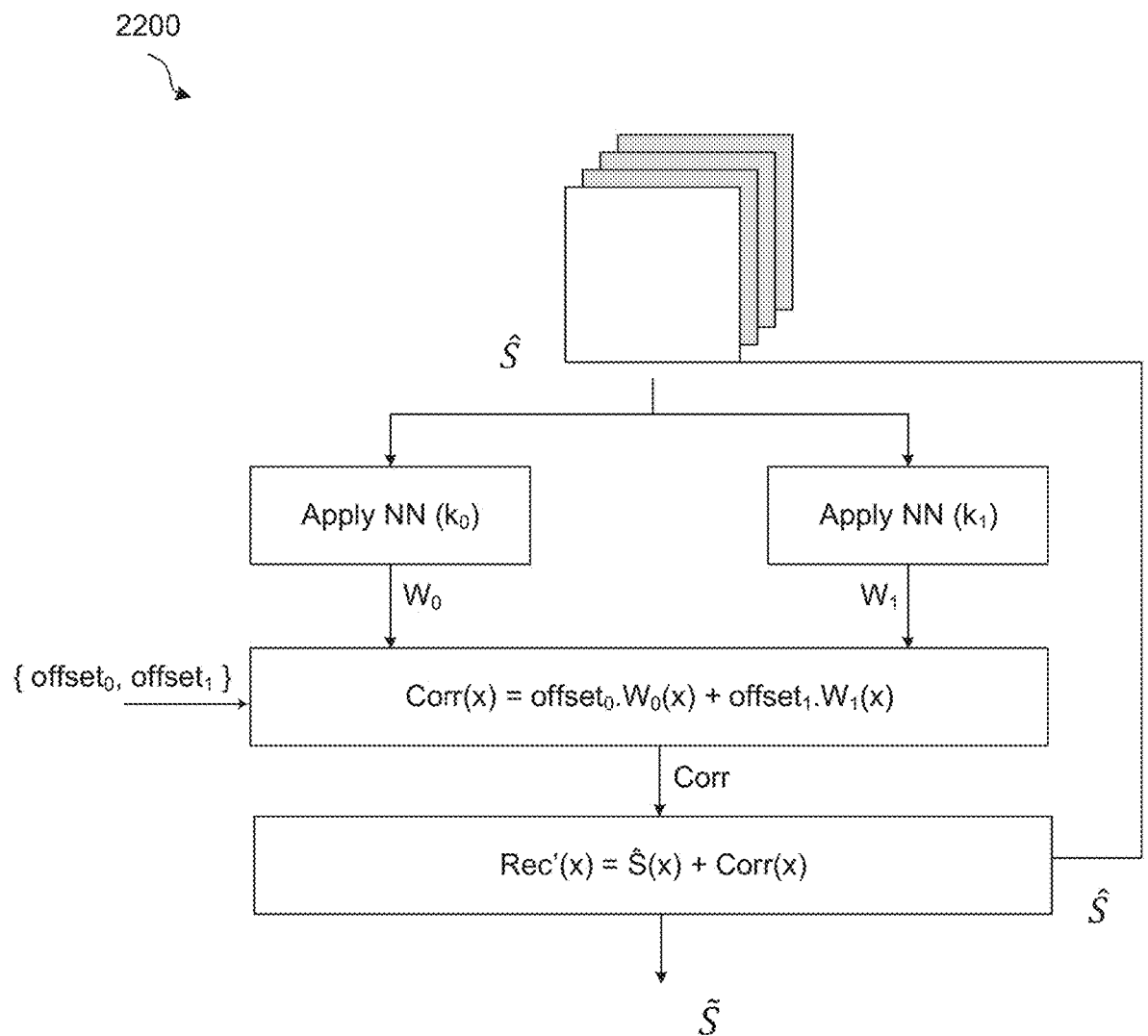
FIG. 21 illustrates an example of the linear combination of NN outputs.
FIG. 22 illustrates a decoding process that uses multiple NNs for correction, according to an embodiment.

In the following, K=2 is used as an example, but it can be easily extended to values of K>2. FIG. 22 illustrates a decoding process (2200) that uses multiple NNs for correction, according to an embodiment. Similar to method 2000, multiple NNs are used to filter the initial reconstructed samples Ŝ. At the encoder side, method 2000 derives $\text{offset}_1$ and $\text{offset}_2$ at step 2040. At the decoder side, method 2200 decodes $\text{offset}_1$ and $\text{offset}_2$ from the bitstream.

Figure 23:
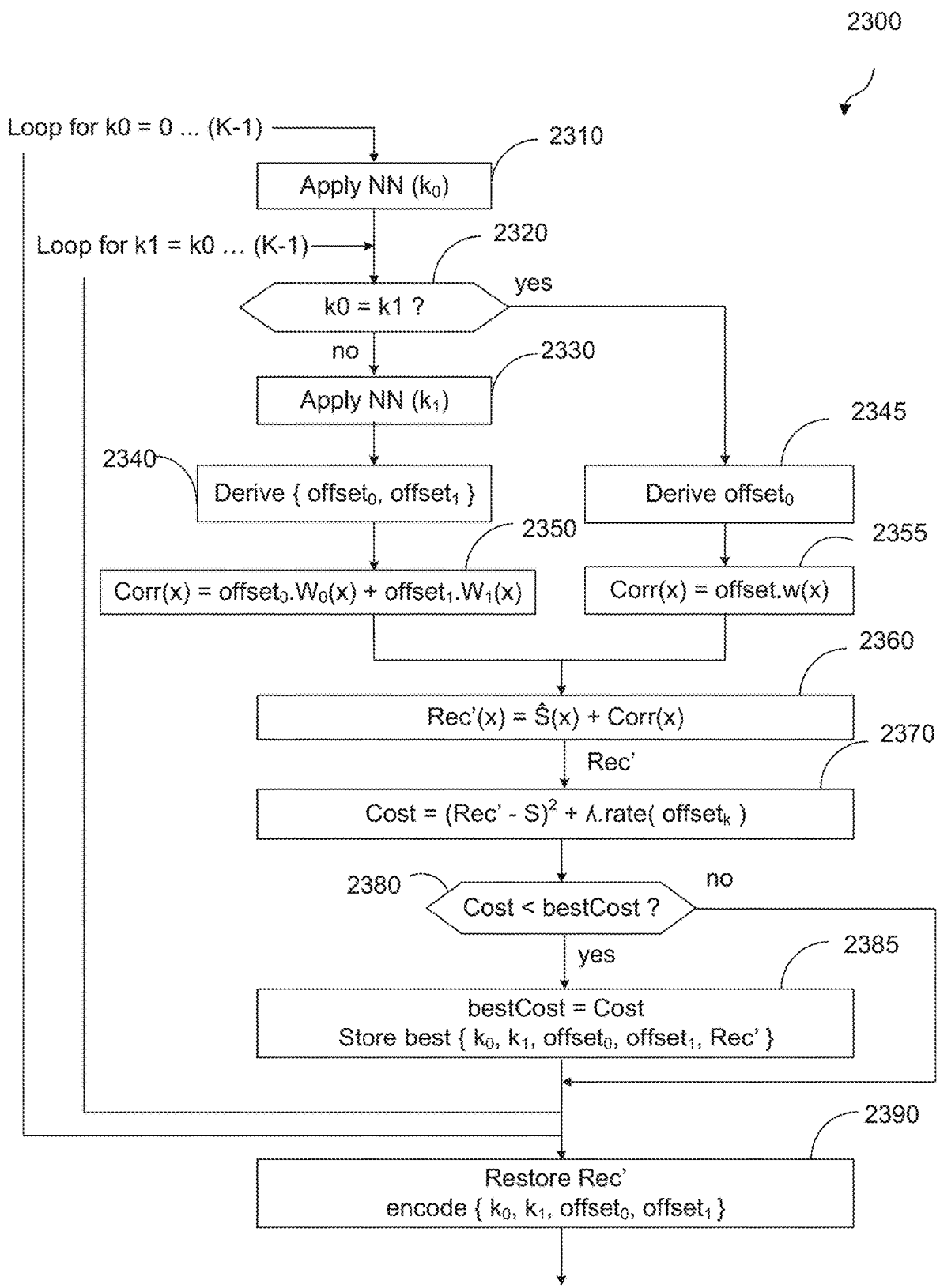
FIG. 23 illustrates a method for selecting K NNs to be combined, according to an embodiment.

FIG. 23 illustrates a method (2300) for selecting K NNs to be combined for K=2, given a current reconstructed block. Initially, bestCost is set to a large value. For each possible pair $\{k_0; k_1\}$ (2320), if $k_0=k_1$, $NN(k_0)$ is applied (2310) and one single $\text{offset}_0$ is derived (2345). If $k_0 \neq k_1$, $NN(k_1)$ is also applied (2310) and scaling parameters $\{\text{offset}_0; \text{offset}_1\}$ are derived (2340). The correction factor is calculated (2350, 2355), and the corrected reconstructed block Rec'(Ŝ) is computed (2360). Next the encoding cost is estimated (2370) with a Lagrangian multiplier for example, taking into the distortion with original block and the coding cost of $\{k_0; k_1; \text{offset}_0; \text{offset}_1\}$. If the cost from the current pair $\{k_0; k_1\}$ is smaller than bestCost (2380), bestCost is set to the current Cost, and $\{k_0; k_1; \text{offset}_0; \text{offset}_1, \text{Rec}'\}$ is stored (2385). After all possible pairs are tested, Rec' associated with the bestCost is restored, and parameters $\{k_0; k_1; \text{offset}_0; \text{offset}_1\}$ are encoded (2390).

Example of Syntax

TABLE 2 provides an example for coding syntax elements related to various embodiment described above. In particular, TABLE 2 provides an example of syntax for coding the indexes of NNs and scaling parameters to be used for correcting one reconstructed block with a mutual combination of NNs. In this example, the current block location in the picture is (rx, ry) and K=2 for luma component, K=1 for chroma component.

TABLE 2

|  | Descriptor |
| --- | --- |
| nn_filter( rx, ry ) { | |
|   for( cIdx = 0; cIdx < ( sps_chroma_format_idc != 0 ? 3 : 1 ); cIdx++ ) | |
|     if( ( nn_filter_luma_used_flag && cIdx = = 0 ) \|\| ( nn_filter_chroma_used_flag && cIdx > 0 ) ) { | |
|       if( cIdx = = 0 ) | |
|         filter_luma_flag | ae(v) |
|       else if( cIdx = = 1 ) | |
|         filter_chroma_flag | ae(v) |
|       if( (cIdx == 0 && filter_luma_flag) ) { | |
|         idx_filter_off_val_luma[0] | ae(v) |
|         if ( idx_filter_off_val_luma[0] < (K-1) ) | |
|           idx_filter_off_val_luma[1] | ae(v) |
|         cpt_scale_off = (idx_filter_off_val_luma[0]==idx_filter_off_val_luma[0])?1:2 | |
|       } | |
|       else if (cIdx ==1 0 && filter_chroma_flag) { | |
|         idx_filter_off_val_chroma | |
|         cpt_scale_off = 1 | |
|       } | |
|       if( (cIdx == 0 && filter_luma_flag) \|\| (cIdx > 0 && filter_chroma_flag) ) { | |
|         for( i = 0; i < cpt_scale_off; i++ ) | |
|           scale_off_diff_abs[ cIdx ][ rx ][ ry ][ i ] | ae(v) |
|           if( scale_off_diff_abs[ cIdx ][ rx ][ ry ][ i ] != 0 ) | |
|             scale_off_diff_sign_flag[ cIdx ][ rx ][ ry ][ i ] | ae(v) |
|       } | |
|     } | |
| } | |

The semantics of the syntax elements are the following: filter_luma_flag, filter_chroma_flag specifies whether the luma or chroma sample block is corrected (with NN filters) or not, respectively.

idx_filter_off_val_luma[k] allows deriving the K indexes $\{k_i\}_{i=0,1}$ of the NNs to be used for inferring the K NN outputs to be combined. For example, $k_i$=idx_filter_off_val_luma[i].

In one embodiment, the values of $k_i$ are ordered (e.g., increasing order) before coding so that $k_{i+1} \geq k_i$. Enabling the case $k_{i+1}=k_i$, allows addressing the case where the number of actually used NN filters (cpt_scale_off) is less than K NN filters and less than K scaling parameters are encoded consequently. The variable cpt_scale_off corresponds to the number of non-zero scaling parameters $\text{offset}_k$.

In an example, an identifier indicates how many NNs are combined. For example, in case of K=2, the case $k_0=k_1$ allows to manage the case where only one single NN is used (no mutual combination) and one scaling parameter is coded only.

In a variant, the K indexes $\{k_i\}_{i=0,1}$ are derived as follows:

$$k_i = \text{pred\_idx\_filter}[i] + \text{idx\_filter\_off\_val\_luma}[i] \% (K)$$

where "pred_idx_filter[i]" is a predictor of value $k_i$. For example, the predictor can be previous index: pred_idx_filter[i]=$k_{i-1}$, or the previously decoded NN-filter index.

In another variant, the N possible indexes are ordered into a table which is up-dated before coding the NN parameters (nn_filter( )) for each block. The up-date is made by moving on top of the list the most probable indexes (ex: indexes used by previously coded left anf top blocks). In this way, the old coded indexes slowly go to the bottom of the list while the most recently used ones are on top of the list. The value coded (idx_filter_off_val_luma[i]) represents the index corresponding to the filter in this list (not the filter index itself) without prediction (pred_idx_filter[i]=0).

scale_off_diff_abs[i] allows deriving the scaling parameters values offset$_i$ as:

offset$_i$=pred_scale_off[i]+diff[i]

where diff[i]=scale_off_diff_sign_flag[cIdx][rx][ry][i]?1:(−1)*scale_off_diff_abs[i].

The variable "pred_scale_off[i]" is the predictor of off. For example:

pred_scale_off[i]=(i>0)?pred_scale_off[i−1]: 0

In a variant, "pred_scale_off[i]" is equal to the last decoded value of off$_x$. idx_filter_off_val_chroma allows deriving the index kc of the NN to be used for inferring the K NN outputs to be combined. For example, kc=idx_filter_off_val_chroma. Indeed, in the example of TABLE 2, the filter indexes of chroma components cIdx=1 and cIdx=2 are identical.

TABLE 3a shows the result of using the proposed Mutual Combination of NNs method for luma NN filters, compared to the NN based filter without combining NN outputs. With the proposed combination of NN outputs, about 0.89% bitrate reduction is obtained compared to 0.57% bitrate reduction for the method without combination. TABLE 3b shows results obtained with the proposed Mutual Combination of NNs with another set of NNs. The results of TABLE 3a and TABLE 3b (left) have been obtained with NNs trained with ReLU activation function. The results of TABLE 3b (right) have been obtained with NNs trained with Leaky ReLU activation function. In this example, about 2.45% bitrate reduction is obtained using LeakyReLU activation function compared to 1.60% bitrate reduction with ReLU activation function.

TABLE 3a

| VVC-8.0 - Random Access Main 10 (one intra period P1) | | | | | |
|---|---|---|---|---|---|
| NN filters without combination | | | Mutual Combination of NNs | | |
| Y | U | V | Y | U | V |
| Class B | −0.79% | −0.92% | −0.19% | −1.24% | −0.92% | 0.13% |
| Class C | −0.36% | −1.56% | −0.41% | −0.71% | −1.49% | −0.35% |
| Class D | −0.55% | −1.03% | −1.38% | −0.73% | −1.31% | −1.56% |
| Overall | −0.57% | −1.17% | −0.66% | −0.89% | −1.24% | −0.59% |

TABLE 3b

| VVC-10.0 - Random Access Main 10 (one intra period P1) | | | | | |
|---|---|---|---|---|---|
| NN filters trained with ReLU | | | NN filters trained with Leaky ReLU | | |
| Y | U | V | Y | U | V |
| Class B | −1.55% | −0.84% | 0.39% | −1.96% | −5.85% | −4.99% |
| Class C | −1.33% | −1.75% | 0.10% | −2.05% | −8.13% | −7.03% |

TABLE 3b-continued

| VVC-10.0 - Random Access Main 10 (one intra period P1) | | | | | |
|---|---|---|---|---|---|
| NN filters trained with ReLU | | | NN filters trained with Leaky ReLU | | |
| Y | U | V | Y | U | V |
| Class D | −1.93% | −1.63% | −1.02% | −3.35% | −8.15% | −10.31% |
| Overall | −1.60% | −1.41% | −0.53% | −2.45% | −7.38% | −7.44% |

Spatial Combination of NNs

In another embodiment, several NNs are combined for correcting the current reconstructed block using spatial segmentation of the block into several (K) regions, where different NNs may be used for different block partitions. FIG. 24 shows some examples of such spatial partitioning with K=2 and K=4, where different patterns are associated to different NN filters. In these examples, one scaling parameter (offset$_k$) is coded for each partition/region of the block.

In a variant, several partitions in the block use the same NN but different scaling parameter values possibly, as depicted in FIG. 24(f). At the decoding stage, this has the advantage of inferring one single NN but tailoring the scaling to each partition.

Figure 25:
FIG. 25 illustrates that the number of actually used NNs depends on the partitioning shape, according to an embodiment.

TABLE 4 provides an example of syntax elements associated with this embodiment. In particular, TABLE 4 provides an example of syntax for coding index of NN, partition shape (dir_split) and scaling parameters to be used for correcting one reconstructed block with mutual combination of NNs. In this example, the current block location in the picture is (rx; ry) and K=1 for chroma component. For the luma component, the number of actually used NNs (cpt_scale_off) depends on the partitioning shape as shown in FIG. 25. The semantics of the syntax elements are the same as in TABLE 2. The index or scaling parameter predictors may be the values of the previously decoded partitions.

TABLE 4

| | Descriptor |
|---|---|
| nn_filter( rx, ry ) { | |
|   for( cIdx = 0; cIdx < ( sps_chroma_format_idc != 0 ? 3 : 1 ); cIdx++ ) | |
|     if( ( nn_filter_luma_used_flag && cIdx = = 0 ) \|\| ( nn_filter_chroma_used_flag && cIdx > 0 ) ) { | |
|       if( cIdx = = 0 ) | |
|         filter_luma_flag | ae(v) |
|       else if( cIdx = = 1 ) | |
|         filter_chroma_flag | ae(v) |
|       if( (cIdx == 0 && filter_luma_flag) ) { | |
|         dir_split | ae(v) |
|         cpt_scale_off = tab_cpt_scale_off[ dir_split ] | |
|         idx_filter_off_val_luma[0] | ae(v) |
|         if ( idx_filter_off_val_luma[0] < (K-1) ) | |
|           idx_filter_off_val_luma[1] | ae(v) |
|       } | |
|       else if (cIdx ==1 0 && filter_chroma_flag) { | |
|         idx_filter_off_val_chroma | |
|         cpt_scale_off = 1 | |
|       } | |
|       if( (cIdx == 0 && filter_luma_flag) \|\| (cIdx > 0 && filter_chroma_flag) ) { | |
|         for( i = 0; i < cpt_scale_off; i++ ) { | |
|           if ( cIdx < 2 ) | |
|             idx_filter_off_val_luma[ cIdx ] [ I ] | |
|           scale_off_diff_abs[ cIdx ][ rx ][ ry ][ i ] | ae(v) |
|           if( scale_off_diff_abs[ cIdx ][ rx ][ ry ][ i ] != 0 ) | |
|             scale_off_diff_sign_flag[ cIdx ][ rx ][ ry ][ i ] | ae(v) |

TABLE 4-continued

| | Descriptor |
|---|---|
| `        }` | |
| `      }` | |
| `    }` | |
| `}` | |

TABLE 5 shows the result of using the proposed spatial combination of NNs method, compared to the NN based filter without combining NN outputs.

TABLE 5

| | VVC-8.0 - Random Access Main 10 (one intra period P1) | | | | | |
|---|---|---|---|---|---|---|
| | NN filter without combination | | | Spatial Combination of NNs | | |
| | Y | U | V | Y | U | V |
| Class A1 | −0.14% | −0.25% | −0.21% | −0.16% | −0.07% | 0.19% |
| Class A2 | −0.75% | −0.06% | 0.20% | −0.78% | 0.10% | 0.26% |
| Class B | −0.79% | −0.92% | −0.19% | −0.80% | −0.93% | 0.01% |
| Class C | −0.36% | −1.56% | −0.41% | −0.41% | −1.51% | −0.66% |
| Overall | −0.54% | −0.79% | −0.18% | −0.56% | −0.70% | −0.08% |
| Class D | −0.55% | −1.03% | −1.38% | −0.58% | −1.22% | −1.67% |

In one embodiment, one may signal in the bitstream (e.g., slice header or picture header) how many NNs may be combined (K). In addition, one may signal the set of the N NNs among a larger set of M NNs, with M>N. In a variant, the N NNs may be inferred from other parameters in the bitstream, such as the quantization parameter (QP), the picture size or the nature of the video (e.g., sport, game, movie). For example, if the M NNs have been trained with video sequences encoded with M different QP values $\{qp_0, \ldots qp_{M-1}\}$, the decoder may infer the N NNs from the current QP. For example, the subset can be made of the NNs that have been trained with some (e.g., 2) QP values below and some (e.g., 2) QP values above the current QP value.

The previous embodiments can be extended to other correction model (expression of Corr(x)) and other models for applying the correction (expression of Rec'(x)). For example, the correction may be based on the following models:

Models of Correction:
  linear correction model. The parameters are $\{offset_k, bias\}$ $Corr(x) = \Sigma_k w_k(x) \cdot offset_k + bias$ Models for Applying the Correction:
  additive correction model:

$\tilde{S}(x) = \hat{S}(x) + Corr(x)$ multiplicative correction model:

$\tilde{S}(x) = \hat{S}(x) \cdot Corr(x)$ linear correction model (bias is one scaling parameter):

$\tilde{S}(x) = \hat{S}(x) \cdot Corr(x) + bias$

As described before, the derivation of the scaling parameters $\{offset_k, bias\}$ can be made by the encoder using for example LSM method, which involves a system of K+1 equations obtained through the partial derivation of (eq.3) relatively to the variables $\{offset_k, bias\}$ equal to zero.

$$\frac{\partial MSE}{\partial off_k} = 0 \quad \frac{\partial MSE}{\partial bias} = 0$$

Region-Based NN-Filter (e.g., Deblocking Filter)

Figure 26:
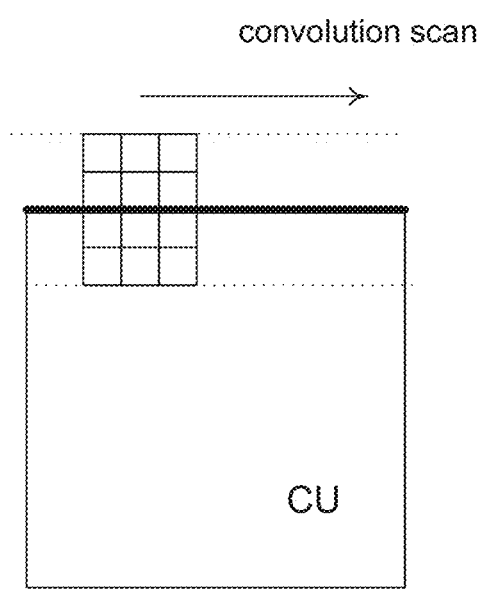
FIG. 26 illustrates an example of application of 3×4 convolution layer in one direction only.

In case the NN-filter is a region-based filter specialized in correcting some spatially located artefacts of known locations (e.g., deblocking filters), the correction may be limited to these known locations (e.g., reconstructed CU edges). In this case, the NN-filter inference may be one direction scanning convolution as shown in FIG. 26, in the direction of the spatially known artefacts location (e.g., horizontal or vertical CU edges).

Training

The training of NNs (setting of NN parameters) can be made with traditional methods based on supervised learning where the output of the NN is matched with the desired output (original signal), trying to minimize a loss function such as the difference between NN output and the desired output. One can use for example back-propagation methods where the computation of the gradient of the loss function with respect to the weights of the network allow adjusting iteratively the weights and biases of the NN, such as gradient descent or stochastic gradient descent.

In one embodiment, the training of the NN parameters is performed by minimizing the loss with gradient descent algorithms. The loss can be the distortion $\|\tilde{S} - S\|$ or rate-distortion measure with coding cost of "$offset_k$" or "$offset_k$ and $b_k$".

For the training stage, the dataset contains set of pairs $\{\hat{S}, S\}$ that may be block patches. One can create the $\hat{S}$ values by extracting reconstructed blocks from encoded video bitstreams.

Figure 27:
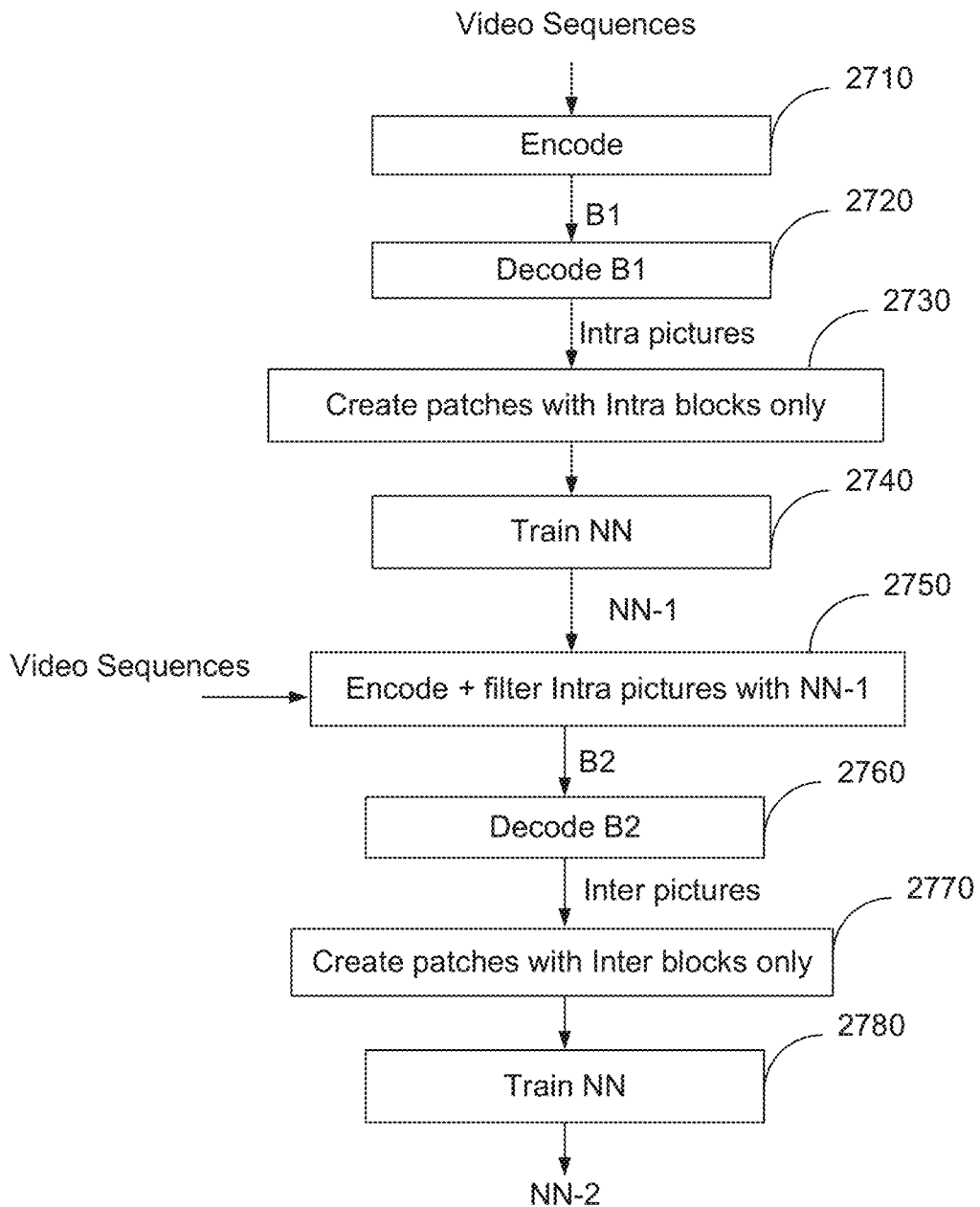
FIG. 27 illustrates an example of training the NNs based on datasets with different coding mode features, according to an embodiment.

The classification may be done with coding modes, with datasets created from blocks coded with a range of QPs, or blocks selected from I pictures only, or P or B pictures only, as illustrated in FIG. 27. That is, one can train several NNs based on datasets with different coding mode features. Also, the training may be done in at least two passes. In the first pass, a set of NN (NN-1) are trained (2740) with patches extracted (2730) from Intra pictures of decoded bitstreams B1 (2710, 2720), then a set of video sequences are encoded (2750) with these NN-1 filters enabled on Intra pictures only to generate bitstreams B2. In the second pass, one can extract (2770) patches from Inter pictures of decoded bitstreams B2 (2760) in order to train (2780) another set of NNs (NN-2), dedicated for filtering Inter pictures.

If the purpose of the NN filter is to replace existing filters (e.g., SAO, ALF . . . ) used in the bitstreams, one can select the $\hat{S}$ values with the classification existing in the bitstream. For example, considering SAO, if $\hat{S}$ has been encoded with SAO parameters EO_90, then it will be associated with NN-filter associated with "EO_90".

However, the classification in the bitstream may be biased by the encoder choice that may have been based on rate-distortion and other contextual considerations. For example, the coding cost (rate) depends on the CABAC contexts which depend on the history of the CABAC encoder. For the training, it may be preferable not to consider the rate cost but the distortion only. One can overcome this limitation by choosing for $\hat{S}$ the CTUs coded in mode NEW only (discarding the modes merge and OFF) but the encoding bias still exists.

Preferably, one could consider not using SAO parameters in the bitstream but re-determining the best SAO mode given $\{\hat{S}, S\}$ and using the distortion only.

For the schemes with multiple NNs, fine tuning can be performed iteratively as follows:

1) Stage-1: separate the main dataset MD into k dataset $D_b$ (b=1, . . . k).

2) Training of k NN filters separately.

3) Stage-2: regenerate k datasets $D_b$ (b=1, . . . k) as follows: for each data "I" in MD, select the NN filter "t" that minimizes the loss and append $D_t$ with the "i". Next re-train the k filters with $D_b$ (b=1, . . . k).
4) Iterate on 3).

However, it may happen that the number of data in one dataset "x" can become very small. To avoid this issue, one may determine a minimal number of data N in each dataset and proceed as follows:
1) Stage-1: separate the main dataset MD into k dataset $D_b$ (b=1, . . . , k).
2) Train k NN filters separately.
3) Stage-2:
   for each data "i" in MD:
      Initialize the list of dataset candidate for "i" to C(i)= {0, . . . (k−1)}
      compute the loss obtained with each filter b: Lb(i).
      "i" is marked as "not placed"
   for each data "i" in MD:
      while (data "i" marked as not placed in one dataset)
         t=argmin$_k$ {L$_k$(i)} (k=t is the filter which minimizes L$_k$(i) with k ∈C(i))
         if card{Dt<N} then append Dt with data "i"
         else if one data "d" in Dt has loss Lt(d)>Lt(i) then replace "d" with "i" in Dt, and "d" becomes (marked as) "not placed", "i" is marked as "placed"
         else remove "t" from list C(i)
4) Re-train the k filters with $D_b$ (b=1, . . . , k).
5) Iterate on 3)

In the above, the NN filtering process is performed block by block as the current video standards are usually block based. However, the present embodiments can be applied to a region that has a shape that is different from rectangular or square, as the NN can be trained and implemented for other shapes, or can be a fully convolutional network, hence independent of the region shape or size.

Legacy filters like SAO or ALF in HEVC and VVC use a closed-loop approach where an "optimal" correction is computed, but the classification of pixels to filters is usually very simple. On the other hand, previous CNN-based approaches use a sophisticated classification but use an open-loop correction where the correction is not necessarily beneficial. According to the present embodiment, a deep Neural Network (NN) is provided to restore images after reconstruction by a video codec, to replace or complement the SAO filter. In particular, the proposed filters leverage the power of a CNN for the classification of pixels to correct, while keeping the correction "closed-loop" by computing at the encoder the optimal correction to apply. To generalize a binary classification, the CNN can also compute the amount of correction to set on a particular pixel. It leverages the benefit of encoding a parameter to control the filter action while only requiring small amount of data to be encoded in the bitstream.

With the proposed filters as shown in FIG. 12 and FIG. 13, only a single offset is transmitted for a block, or as shown in FIG. 14, one or more offsets are transmitted for the block. That is, a very small amount of data is to be encoded to signal the offset. However, because the NN can generate a pixel-wise weight mask (values in the mask may vary from pixel to pixel), the actual offset (weight*offset) to be applied to adjust the pixels in the block may vary from pixel to pixel, thus achieving a finer granularity than the SAO filter in HEVC and VVC with a lower signaling cost. The NN may also produce the weights on a sub-block basis (same weight within a sub-block, but weights can vary from sub-block to sub-block in the block).

Also, the proposed NN filter may be applied at some specific locations only in the picture. For example, it may be used to correct blocking artefact specifically, which occurs near block frontier mainly, and/or at transform border only or prediction unit only.

Additionally, the methods are not limited to NN based filter but can be applied to any other or traditional filters where correction terms are added to reconstructed pictures to improve image quality and reduce coding artefacts. While in-loop filtering is described in the above examples, the proposed filtering methods can also be performed out of the coding loop, for example, as a post-processing step applied outside the decoder.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the motion refinement and motion compensation modules (270, 272, 372, 375), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
accessing a version of reconstructed samples of a region of a picture;
generating a weight for each sample of a plurality of samples in said region based on said version of reconstructed samples of said region, using a neural network;
encoding an offset parameter in a bitstream, wherein neural network parameters of said neural network are not transmitted in said bitstream; and
filtering said plurality of samples in said region, wherein a sample of said plurality of samples in said region is adjusted based on a weight for said sample and said offset parameter for said region, and wherein said offset parameter for said region is scaled by said weight for said sample and said scaled offset is added to said sample to adjust said sample.

2. The method of claim 1, wherein a plurality of neural networks are used, and wherein each network of said plurality of neural networks corresponds to a classification of said region.

3. The method of claim 1, further comprising:
generating another weight for each sample of said plurality of samples in said region based on said version of reconstructed samples of said region, using another neural network; and
encoding another offset parameter corresponding to said another neural network for said region in said bitstream, wherein neural network parameters for said another neural network are not encoded in said bitstream,
wherein said sample in said region is adjusted further based on said another weight for said sample and said another offset parameter for said region, and wherein said another offset parameter for said region is scaled by said another weight for said sample and said scaled another offset is further added to said sample to adjust said sample.

4. The method of claim 3, wherein a sum of said scaled offset and said scaled another offset is added to said sample in said region to filter said sample.

5. An apparatus, comprising one or more processors, wherein said one or more processors are configured to:
   access a version of reconstructed samples of a region of a picture;
   generate a weight for each sample of a plurality of samples in said region based on said version of reconstructed samples of said region, using a neural network;
   encode an offset parameter for said region in a bitstream, wherein neural network parameters of said neural network are not transmitted in said bitstream; and
   filter said plurality of samples in said region, wherein a sample of said plurality of samples in said region is adjusted based on a weight for said sample and said offset parameter for said region, and wherein said offset parameter for said region is scaled by said weight for said sample and said scaled offset is added to said sample to adjust said sample.

6. The apparatus of claim 5, wherein a plurality of neural networks are used, and wherein each network of said plurality of neural networks corresponds to a classification of said region.

7. The apparatus of claim 5, wherein said one or more processors are further configured to:
   generate another weight for each sample of said plurality of samples in said region based on said version of reconstructed samples of said region, using another neural network; and
   encode another offset parameter corresponding to said another neural network for said region in said bitstream, wherein neural network parameters for said another neural network are not encoded in said bitstream,
   wherein said sample in said region is adjusted further based on said another weight for said sample and said another offset parameter for said region, and wherein said another offset parameter for said region is scaled by said another weight for said sample and said scaled another offset is further added to said sample to adjust said sample.

8. The apparatus of claim 7, wherein a sum of said scaled offset and said scaled another offset is added to said sample in said region to filter said sample.

9. A method, comprising:
   accessing a version of reconstructed samples of a region of a picture;
   generating a weight for each sample of a plurality of samples in said region based on said version of reconstructed samples of said region, using a neural network;
   decoding an offset parameter corresponding to said neural network for said region from a bitstream, wherein neural network parameters of said neural network are not transmitted in said bitstream; and
   filtering said plurality of samples in said region, wherein a sample of said plurality of samples in said region is adjusted based on a weight for said sample and said offset parameter for said region, and wherein said offset parameter for said region is scaled by said weight for said sample and said scaled offset is added to said sample to adjust said sample.

10. The method of claim 9, wherein a plurality of neural networks are used, and wherein each network of said plurality of neural networks corresponds to a classification of said region.

11. The method of claim 9, further comprising:
    generating another weight for each sample of said plurality of samples in said region based on said version of reconstructed samples of said region, using another neural network; and
    decoding another offset parameter corresponding to said another neural network for said region in said bitstream, wherein neural network parameters for said another neural network are not encoded in said bitstream,
    wherein said sample in said region is adjusted further based on said another weight for said sample and said another offset parameter for said region, and wherein said another offset parameter for said region is scaled by said another weight for said sample and said scaled another offset is further added to said sample to adjust said sample.

12. The method of claim 11, wherein a sum of said scaled offset and said scaled another offset is added to said sample in said region to filter said sample.

13. An apparatus, comprising one or more processors, wherein said one or more processors are configured to:
    access a version of reconstructed samples of a region of a picture;
    generate a weight for a respective sample of a plurality of samples in said region based on said version of reconstructed samples of said region, using a neural network;
    decode an offset parameter for said region from a bitstream, wherein neural network parameters of said neural network are not transmitted in said bitstream; and
    filter said plurality of samples in said region, wherein a sample of said plurality of samples in said region is adjusted based on a weight for said sample and said offset parameter for said region, and wherein said offset parameter for said region is scaled by said weight for said sample and said scaled offset is added to said sample to adjust said sample.

14. The apparatus of claim 13, wherein a plurality of neural networks are used, and wherein each network of said plurality of neural networks corresponds to a classification of said region.

15. The apparatus of claim 13, wherein said one or more processors are further configured to:
    generate another weight for each sample of said plurality of samples in said region based on said version of reconstructed samples of said region, using another neural network; and
    decode another offset parameter corresponding to said another neural network for said region in said bitstream, wherein neural network parameters for said another neural network are not encoded in said bitstream,
    wherein said sample in said region is adjusted further based on said another weight for said sample and said another offset parameter for said region, and wherein said another offset parameter for said region is scaled by said another weight for said sample and said scaled another offset is further added to said sample to adjust said sample.

16. The apparatus of claim 15, wherein a sum of said scaled offset and said scaled another offset is added to said sample in said region to filter said sample.

* * * * *